(12) United States Patent
Noguchi

(10) Patent No.: US 9,387,847 B2
(45) Date of Patent: Jul. 12, 2016

(54) FRONT-AND REAR-WHEEL-DRIVE VEHICLE

(75) Inventor: Masatoshi Noguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 744 days.

(21) Appl. No.: 13/242,974

(22) Filed: Sep. 23, 2011

(65) Prior Publication Data
US 2012/0083955 A1 Apr. 5, 2012

(30) Foreign Application Priority Data

Sep. 30, 2010 (JP) ................................ P2010-222855
Dec. 27, 2010 (JP) ................................ P2010-290697

(51) Int. Cl.
*B60L 9/00* (2006.01)
*B60L 11/00* (2006.01)
(Continued)

(52) U.S. Cl.
CPC .................. *B60W 10/06* (2013.01); *B60K 6/52* (2013.01); *B60L 3/106* (2013.01); *B60L 7/18* (2013.01); *B60L 11/123* (2013.01); *B60L 11/14* (2013.01); *B60L 11/1861* (2013.01); *B60L 15/20* (2013.01); *B60W 10/08* (2013.01); *B60W 10/119* (2013.01); *B60W 20/11* (2016.01); *B60W 30/18036* (2013.01); *B60L 2220/46* (2013.01); *B60L 2240/12* (2013.01); *B60L 2240/36* (2013.01);
(Continued)

(58) Field of Classification Search
CPC .......... B60K 1/00; B60K 23/08; B60K 25/00; B60K 26/00; B60K 6/52; B60K 17/34; B60K 17/356; B60L 2260/28; Y02T 10/6265
See application file for complete search history.

(56) References Cited

U.S. PATENT DOCUMENTS 4,380,048 A * 4/1983 Kishi et al. ...................... 701/56
4,410,071 A * 10/1983 Osterman ......................... 477/4
(Continued)

FOREIGN PATENT DOCUMENTS

CN 1154680 A 7/1997
JP 09-175203 A 7/1997
(Continued)

OTHER PUBLICATIONS

Japanese Office Action, Japanese Application No. 2010-290697 issued on Mar. 11, 2014.
(Continued)

*Primary Examiner* — Jerrah Edwards
*Assistant Examiner* — Tommy Worden
(74) *Attorney, Agent, or Firm* — Westerman, Hattori, Daniels & Adrian, LLP

(57) ABSTRACT

One embodiment provides a vehicle including: a first drive system configured to drive first wheels; and a second drive system configured to drive second wheels, wherein the first drive system includes: an electric motor; a motor controller; an engagement/disengagement unit provided between the electric motor side and the first drive wheels side; an engagement/disengagement controller; and a one-way power transmission unit provided between the electric motor side and the first drive wheels side in parallel to the engagement/disengagement unit, and configured, at least, to engage the both sides when a reverse-direction rotational power is inputted from the first wheels side to the electric motor side, wherein, when the vehicle reverses, a reverse driving force to reverse the vehicle is generated at least in the first drive system.

25 Claims, 17 Drawing Sheets

| VEHICLE CONDITION | FRONT UNIT | REAR UNIT | REAR MOTORS | OWC | BRK |
|---|---|---|---|---|---|
| STOPPED | × | × | STOPPED | OFF | OFF |
| ADVANCING (LOW VEHICLE SPEED) | × | ○ | POWER DRIVEN | ON | ON (SLIGHTLY APPLIED) |
| ADVANCING (INTERMEDIATE VEHICLE SPEED) | ○ | × | STOPPED | OFF | ON (SLIGHTLY APPLIED) |
| DECELERATING REGENERATION | ○ | ○ | DRIVEN FOR REGENERATION | OFF | ON |
| ACCELERATED | ○ | ○ | POWER DRIVEN | ON | ON (SLIGHTLY APPLIED) |
| ADVANCING (HIGH VEHICLE SPEED) | ○ | × | STOPPED | OFF | OFF |
| REVERSING (RWD) | × | ○ | POWER DRIVEN REVERSELY | OFF | ON |
| REVERSING (AWD) | ○ | ○ | POWER DRIVEN REVERSELY | OFF | ON |

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 10/06* | (2006.01) | |
| *B60K 6/52* | (2007.10) | |
| *B60L 3/10* | (2006.01) | |
| *B60L 7/18* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *B60W 10/08* | (2006.01) | |
| *B60W 10/119* | (2012.01) | |
| *B60W 30/18* | (2012.01) | |

(52) U.S. Cl.
CPC ...... *B60L 2240/423* (2013.01); *B60L 2240/441* (2013.01); *B60L 2240/461* (2013.01); *B60L 2240/545* (2013.01); *B60L 2260/28* (2013.01); *B60W 2510/244* (2013.01); *B60W 2520/10* (2013.01); *B60W 2550/142* (2013.01); *B60W 2550/148* (2013.01); *B60W 2720/403* (2013.01); *B60Y 2400/82* (2013.01); *Y02T 10/6217* (2013.01); *Y02T 10/6265* (2013.01); *Y02T 10/6286* (2013.01); *Y02T 10/645* (2013.01); *Y02T 10/648* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 4,480,505 | A * | 11/1984 | Takano et al. | 477/36 |
| 4,938,306 | A * | 7/1990 | Sumiyoshi et al. | 180/233 |
| 5,343,970 | A * | 9/1994 | Severinsky | 180/65.25 |
| 5,522,776 | A * | 6/1996 | Alvey | 477/35 |
| 5,730,243 | A * | 3/1998 | Koike et al. | 180/220 |
| 5,799,748 | A * | 9/1998 | Origuchi | 180/233 |
| 5,804,935 | A * | 9/1998 | Radev | 318/139 |
| 5,804,947 | A * | 9/1998 | Nii et al. | 322/16 |
| 5,997,428 | A * | 12/1999 | Kagata et al. | 475/198 |
| 6,005,358 | A * | 12/1999 | Radev | 318/139 |
| 6,041,877 | A * | 3/2000 | Yamada | B60K 6/40 180/242 |
| 6,053,842 | A * | 4/2000 | Kitada et al. | 477/5 |
| 6,155,364 | A * | 12/2000 | Nagano et al. | 180/65.235 |
| 6,334,079 | B1 * | 12/2001 | Matsubara et al. | 701/22 |
| 6,425,838 | B1 * | 7/2002 | Matsubara et al. | 475/5 |
| 6,540,642 | B2 * | 4/2003 | Tabata | 477/5 |
| 6,606,549 | B1 * | 8/2003 | Murakami et al. | 701/89 |
| 6,638,195 | B2 * | 10/2003 | Williams | 477/5 |
| 6,712,165 | B1 * | 3/2004 | Okazaki | 180/65.21 |
| 2001/0003109 | A1 | 6/2001 | Tabata | |
| 2002/0014869 | A1 * | 2/2002 | Omata et al. | 318/139 |
| 2002/0084118 | A1 * | 7/2002 | Esaki | 180/65.2 |
| 2003/0019674 | A1 * | 1/2003 | Duan | 180/65.3 |
| 2003/0158638 | A1 * | 8/2003 | Yakes et al. | 701/22 |
| 2003/0226414 | A1 * | 12/2003 | Matsuo et al. | 74/325 |
| 2004/0094928 | A1 | 5/2004 | Amanuma | |
| 2004/0111206 | A1 * | 6/2004 | Nagano | 701/69 |
| 2004/0147366 | A1 | 7/2004 | Aoki et al. | |
| 2005/0178592 | A1 | 8/2005 | Yamamoto et al. | |
| 2005/0269991 | A1 * | 12/2005 | Mitsui et al. | 320/132 |
| 2006/0091858 | A1 * | 5/2006 | Johnson et al. | 320/128 |
| 2006/0166777 | A1 * | 7/2006 | Aikawa et al. | 475/149 |
| 2007/0034471 | A1 * | 2/2007 | Asano et al. | 192/48.6 |
| 2008/0103709 | A1 * | 5/2008 | Yun et al. | 702/63 |
| 2008/0182718 | A1 * | 7/2008 | Ido et al. | 477/125 |
| 2008/0251302 | A1 * | 10/2008 | Lynn et al. | 180/65.2 |
| 2009/0024338 | A1 * | 1/2009 | Suzuki | 702/63 |
| 2009/0045026 | A1 * | 2/2009 | Ishii et al. | 192/87.14 |
| 2009/0195375 | A1 * | 8/2009 | Berg et al. | 340/456 |
| 2009/0251103 | A1 * | 10/2009 | Yamamoto et al. | 320/133 |
| 2010/0025131 | A1 * | 2/2010 | Gloceri et al. | 180/65.28 |
| 2010/0116235 | A1 * | 5/2010 | Imamura et al. | 123/179.3 |
| 2012/0259492 | A1 * | 10/2012 | Yamamoto | B60K 6/52 701/22 |
| 2013/0190986 | A1 * | 7/2013 | Nishimori | 701/41 |
| 2014/0231165 | A1 * | 8/2014 | Hori | 180/242 |
| 2015/0014081 | A1 * | 1/2015 | Noguchi | 180/243 |
| 2015/0046005 | A1 * | 2/2015 | Kasuya et al. | 701/22 |

FOREIGN PATENT DOCUMENTS

| | | |
|---|---|---|
| JP | 09-280083 A | 10/1997 |
| JP | 11-099838 A | 4/1999 |
| JP | 11-243664 A | 9/1999 |
| JP | 2000-320581 A | 11/2000 |
| JP | 2003-032806 A | 1/2003 |
| JP | 2004-168176 A | 6/2004 |
| JP | 2006-258279 A | 9/2006 |
| JP | 2009-142036 A | 6/2009 |

OTHER PUBLICATIONS

Office Action, Japanese Application No. 2010-290697 mailed Jul. 9, 2013.

Chinese Office Action, Application No. 201110285681.7 issued Nov. 28, 2013.

Japanese Office Action dated Aug. 18, 2014, issued in corresponding Japanese Patent Application 2010-290697, (2 pages).

Office Action dated Jul. 11, 2014, issued in corresponding Chinese Patent Application No. 201110285681.7, with English Translation (15 pages).

\* cited by examiner

FIG. 5

| VEHICLE CONDITION | FRONT UNIT | REAR UNIT | REAR MOTORS | OWC | BRK |
|---|---|---|---|---|---|
| STOPPED | × | × | STOPPED | OFF | OFF |
| ADVANCING (LOW VEHICLE SPEED) | × | ○ | POWER DRIVEN | ON | ON (SLIGHTLY APPLIED) |
| ADVANCING (INTERMEDIATE VEHICLE SPEED) | ○ | × | STOPPED | OFF | ON (SLIGHTLY APPLIED) |
| DECELERATING REGENERATION | ○ | ○ | DRIVEN FOR REGENERATION | OFF | ON |
| ACCELERATED | ○ | ○ | POWER DRIVEN | ON | ON (SLIGHTLY APPLIED) |
| ADVANCING (HIGH VEHICLE SPEED) | ○ | × | STOPPED | OFF | OFF |
| REVERSING (RWD) | × | ○ | POWER DRIVEN REVERSELY | OFF | ON |
| REVERSING (AWD) | ○ | ○ | POWER DRIVEN REVERSELY | OFF | ON |

FRONT-AND REAR-WHEEL-DRIVE VEHICLE

CROSS-REFERENCE TO RELATED APPLICATION(S)

This application claims priorities from Japanese Patent Applications No. 2010-222855 filed on Sep. 30, 2010 and No. 2010-290697 filed on Dec. 27, 2010, the entire contents of which are incorporated herein by reference.

FIELD

The present invention relates to a front- and rear-wheel-drive vehicle which includes a front-wheel-drive system and a rear-wheel-drive system.

BACKGROUND

JP-2006-258279-A discloses a vehicle 100 in which front wheels are driven by a main drive source such as an engine (not shown) and rear wheels 102 are driven by an auxiliary drive source such as an electric motor 103 via a power transmission mechanism 104.

This power transmission mechanism 104 includes a speed reduction mechanism 105 into which, power from the electric motor 103 is inputted and a differential gear 106 which distributes power outputted from the speed reduction mechanism 105 to left and right rear wheels 102, 102. The speed reduction mechanism 105 includes a speed reduction gear train which is made up of a first gear 105a which is fixed to an output shaft of the electric motor 103, a second gear 105b which meshes with the first gear 105a, and a third gear 105e which meshes with an input gear 106a of the differential gear 106. A hydraulic clutch 107 is provided between the second gear 105b and the third gear 105c. When the hydraulic clutch 107 is applied, the second gear 105b and the third gear 105c are coupled together, whereby power from the electric motor 103 can be transmitted to the rear wheels 102 via the power transmission mechanism 104. When the hydraulic clutch 107 is released, the coupling between the second gear 105b and the third gear 105c is released, whereby the transmission of power from the electric motor 103 to the rear wheels 102 is cut off.

In the power transmission mechanism 104 described in JP-2006-258279-A, in order to transmit the power of the electric motor 103 to the rear wheels 102, the hydraulic clutch 107 needs to be applied strongly and rigidly so as to be held in a large torque capacity state. Therefore, for example, a delay in response may be caused when the fluid temperature is low.

In order to solve the delay in response, for example, a one-way clutch may be further provided in the power transmission mechanism 104 so that the hydraulic clutch 107 is applied when the vehicle moves forwards. However, in this case, the one-way clutch is also applied when the reverse-direction rotation is inputted from the rear wheels to the electric motor 13. That is when the vehicle is reversed by driving the front wheels with the engine (main drive source) while the electric motor (auxiliary drive source) 103 is stopped, the one-way clutch is also applied. As a result of this unintentional application of the one-way clutch, when the vehicle reverses, the electric motor 103 is idly rotated in accordance with the rotation of the rear wheels, and the efficiency of vehicle energy may be deteriorated.

SUMMARY

One object of the present invention is to provide a front- and rear-wheel-drive vehicle which can suppress the deterioration of the efficiency of vehicle energy when the vehicle reverses.

Inventive-Aspect 1 provides a front- and rear-wheel-drive vehicle (e.g., a vehicle 3 in the embodiment) including: first drive wheels (e.g., rear wheels Wr in the embodiment) which are one of front wheels and rear wheels; second drive wheels (e.g., front wheels Wf in the embodiment) which are the other of the front wheels and the rear wheels; a first drive system (e.g., a rear-wheel-drive system 1 in the embodiment) configured to drive the first drive wheels; and a second drive system (e.g., a front-wheel-drive system 6 in the embodiment) configured to drive the second drive wheels, wherein the first drive system includes: an electric motor (e.g., electric motors 2A, 2B, 2C in the embodiment) configured to generate a driving force for the vehicle; a motor controller (e.g., an ECU 45 in the embodiment) configured to control the electric motor; an engagement/disengagement unit (e.g., hydraulic brakes 60A, 60B in the embodiment) provided on a power transmission line between the electric motor and the first drive wheels, and configured to engage or disengage both sides of the electric motor and the first drive wheels; an engagement/disengagement controller (e.g., the ECU 45 in the embodiment) configured to control the engagement/disengagement unit; and a one-way power transmission unit (e.g., a one-way clutch 50 in the embodiment) provided on the power transmission line in parallel to the engagement/disengagement unit, and configured to connect the both sides when a forward-direction rotational power is inputted from the electric motor side to the first drive wheels side, disconnect the both sides when a reverse-direction rotational power is inputted from the electric motor side to the first drive wheels side, disconnect the both sides when the forward-direction rotational power is inputted from the first drive wheels side to the electric motor side and connect the both sides when the reverse-direction rotational power is inputted from the first drive wheels side to the electric motor side, wherein, when the vehicle reverses, a reverse driving force to reverse the vehicle is generated at least in the first drive system, and wherein, when the reverse driving force is generated in the first drive system, the engagement/disengagement controller controls the engagement/disengagement unit to engage the electric motor side with the first drive wheels side, and the motor controller drives the electric motor to generate the reverse-direction rotational power.

Inventive-Aspect 2 provides the vehicle of Inventive-Aspect 1, further including: a reversing controller (e.g., the ECT 45 in the embodiment) configured to perform a switching, when the vehicle reverses, between a one wheels reversing state (e.g., a rear wheels reversing state in the embodiment) in which the reverse driving force is generated only in the first drive system and a front and rear wheels reversing state (e.g., a front and rear wheels reversing state in the embodiment) in which the reverse driving force is generated in both the first drive system and the second drive system.

Inventive-Aspect 3 provides the vehicle of Inventive-Aspect 2, further including: a road surface condition acquiring unit configured to estimate or detect a road surface condition, wherein the reversing controller performs the switching based on the road surface condition.

Inventive-Aspect 4 provides the vehicle of Inventive-Aspect 3, wherein the road surface condition acquiring unit estimates or detects an inclined condition of the road surface as the road surface condition, and wherein the reversing controller performs the switching based on the inclined condition of the road surface.

Inventive-Aspect 5 provides the vehicle of Inventive-Aspect 4, wherein the reversing controller performs the switching to the front and rear wheels reversing state when an inclination toward a reversing direction is larger than a predetermined value.

Inventive-Aspect 6 provides the vehicle of Inventive-Aspect 3, wherein the road surface condition acquiring unit estimates or detects a friction condition of the road surface as the road surface condition, and wherein the reversing controller performs the switching based on the friction condition of the road surface.

Inventive-Aspect 7 provides the vehicle of Inventive-Aspect 6, wherein the reversing controller performs the switching to the front and rear wheels reversing state when a friction is lower than a predetermined value.

Inventive-Aspect 8 provides the vehicle of Inventive-Aspect 2, further including: a reverse intention acquiring unit configured to estimate or detect a reverse intention of the driver of the vehicle, and wherein the reverse intention acquiring unit determines whether the switching should be performed or not after the reverse intention is acquired and before the vehicle starts to reverse.

Inventive-Aspect 9 provides the vehicle of Inventive-Aspect 2, further including: a slip condition acquiring unit configured to estimate or detect a slip in the first drive wheels when the vehicle reverses in the one wheels reversing state, and wherein the reversing controller performs the switching to the front and rear wheels reversing state when the slip occurs.

Inventive-Aspect 10 provides the vehicle of Inventive-Aspect 2, wherein the second drive system includes: an engine (e.g., an engine 4 in the embodiment) configured to generate a driving force for the vehicle; and an additional electric motor (e.g., an electric motor 5 in the embodiment), the vehicle further including: a charged condition acquiring unit configured to estimate or detect a charged amount of a battery system (e.g., a battery 9 in the embodiment) configured to supply power to the electric motor and the additional motor, and wherein the reversing controller controls the engine and the additional electric motor based on the charged amount when the vehicle reverses in the front and rear wheels reversing state.

Inventive-Aspect 11 provides the vehicle of Inventive-Aspect 10, wherein, when the charged amount is lower than a predetermined value, the reversing controller controls the second drive system to generate the driving force by using at least the engine.

Inventive-Aspect 12 provides the vehicle of Inventive-Aspect 10, wherein, when the charged amount is equal to or larger than the predetermined value, the reversing controller controls the second drive system to generate the driving force by using at least the additional electric motor.

Inventive-Aspect 13 provides the vehicle of Inventive-Aspect 10, wherein, when the charged amount is equal to or larger than the predetermined value, the reversing controller controls the second drive system to generate the driving force by using the additional electric motor while stopping the engine.

Inventive-Aspect 14 provides the vehicle of Inventive-Aspect 1, wherein the second drive system includes: an engine (e.g., an engine 4 in the embodiment) configured to generate a driving force for the vehicle; and an additional electric motor (e.g., an electric motor 5 in the embodiment), the vehicle further including: a battery system (e.g., a battery 9 in the embodiment) configured to store a power generated by the additional electric motor; and a power supply controller (e.g., the ECU 45 in the embodiment) configured to control a power supply to the electric motor, and wherein the electric motor is driven by consuming at least either the generated power by the additional electric motor or the supplied power of the battery system.

Inventive-Aspect 15 provides the vehicle of Inventive-Aspect 14, further including: a battery system temperature acquiring unit configured to estimate or detect a temperature of the battery system, wherein, when the temperature of the battery system is lower than a predetermined value, the power supply controller and the motor controller control so that the generated power which is supplied to the electric motor from the additional electric motor does not exceed a consumed power by the electric motor.

Inventive-Aspect 16 provides the vehicle of Inventive-Aspect 15, wherein, when the temperature of the battery system is lower than a predetermined value, the power supply controller and the motor controller control so that the generated power which is supplied to the electric motor from the additional electric motor equals to a consumed power by the electric motor.

Inventive-Aspect 17 provides the vehicle of Inventive-Aspect 14, wherein the power supply controller and the motor controller control so that the generated power which is supplied to the electric motor from the additional electric motor becomes larger than a consumed power by the electric motor.

Inventive-Aspect 18 provides the vehicle of Inventive-Aspect 14, further including: a charged condition acquiring unit configured to estimate or detect a charged amount of the battery system, wherein, when the charged amount is lower than a predetermined value, the power supply controller and the motor controller control so that the generated power which is supplied to the electric motor from the additional electric motor becomes larger than the consumed power by the electric motor.

Inventive-Aspect 19 provides the vehicle of Inventive-Aspect 14, wherein the power supply controller controls so that only the generated power by the additional electric motor is supplied to the electric motor.

Inventive-Aspect 20 provides the vehicle of Inventive-Aspect 19, further including: a charged condition acquiring unit configured to estimate or detect a charged amount of the battery system, wherein, when the charged amount is lower than a predetermined value, the power supply controller controls so that only the generated power by the additional electric motor is supplied to the electric motor.

Inventive-Aspect 21 provides a front- and rear-wheel-drive vehicle (e.g., a vehicle 3 in the embodiment) including: first drive wheels (e.g., rear wheels Wr in the embodiment) which are one of front wheels and rear wheels; second drive wheels (e.g., front wheels Wf in the embodiment) which are the other of the front wheels and the rear wheels; a first drive system (e.g., a rear-wheel-drive system 1 in the embodiment) configured to drive the first drive wheels; and a second drive system (e.g., a front-wheel-drive system 6 in the embodiment) configured to drive the second drive wheels, wherein the first drive system includes: an electric motor (e.g., electric motors 2A, 2B, 2C in the embodiment) configured to generate a driving force for the vehicle; a motor controller (e.g., an ECU 45 in the embodiment) configured to control the electric motor; an engagement/disengagement unit (e.g., hydraulic brakes 60A, 60B in the embodiment) provided on a power transmission line between the electric motor and the first drive wheels, and configured to engage or disengage both sides of the electric motor and the first drive wheels; an engagement/disengagement controller (e.g., the ECU 45 in the embodiment) configured to control the engagement/disengagement unit; and a one-way power transmission unit (e.g., a one-way clutch 50 in the embodiment) provided on the power transmission line in parallel to the engagement/disengagement unit, and configured to connect the both sides when a forward-direction rotational power is inputted from the electric motor side to the first drive wheels side, disconnect the both sides when a reverse-direction rotational power is inputted from the electric motor side to the first drive wheels side, disconnect the both sides when the forward-direction rotational power is inputted from the first drive wheels side to the electric motor side and connect the both sides when the reverse-direction rotational power is inputted from the first drive wheels side to the electric motor side, the vehicle further including: a reverse prohibiting unit configured to prohibit reverse driving using only the driving force of the second drive system when the vehicle reverses.

According to Inventive-Aspect 1, the deterioration of the energy efficiency (fuel and electricity consumption) or the reverse running performance (running through performance) can be suppressed by reversing the vehicle by the reverse driving force generated at least in the first drive system to thereby avoid the state where the vehicle reverses based on only the reverse driving force generated in the second drive system in which the one-way power transmission unit may be engaged to allow the electric motor to idly rotate and to cause the friction.

According to Inventive-Aspect 2, by performing the switching between the one wheels reversing state and the front and rear wheels reversing state, the vehicle is allowed to reverse appropriately in accordance with the energy efficiency or the running conditions.

According to Inventive-Aspect 3, the vehicle is allowed to reverse more appropriately by performing the switching based on the road surface conditions.

According to Inventive-Aspect 4, the switching can be appropriately performed in accordance with the inclined condition of the road surface.

According to Inventive-Aspect 5, when the slope angle in the reverse direction is larger than the predetermined value, the vehicle is reversed to the front and rear wheels reversing state, thereby preventing/suppressing the occurrence of a slip or the risk of the vehicle being unable to climb the slope. In addition, when the slope angle is equal to or smaller than the predetermined value, the vehicle can be reversed in the one wheels reversing state, thereby increasing the energy efficiency when the vehicle reverses.

According to Inventive-Aspect 6, the switching can be appropriately performed in accordance with the friction condition of the road surface.

According to Inventive-Aspect 7, the occurrence of a slip can be prevented or suppressed by reversing the vehicle in the front and rear wheels reversing state when the road surface is in the low friction condition as on the road surface covered with snow. In addition, when the road surface is in the high friction condition, the vehicle can be reversed in the one wheels reversing state, thereby increasing the energy efficiency when the vehicle reverses.

According to Inventive-Aspect 8, the switching is determined before the vehicle starts to reverse, and therefore, when the vehicle starts to reverse, the occurrence of a slip can be suppressed.

According to Inventive-Aspect 9, when a slip is detected while the vehicle is reversing in the one wheels reversing state, by switching to the front and rear wheels reversing state, the slip can be eliminated in the early stage.

According to Inventive-Aspect 10, by controlling the engine and the additional electric motor of the second drive system based on the charged amount of the battery system, the energy efficiency and the running through performance can appropriately be controlled.

According to Inventive-Aspect 11, when the charged amount is lower than the predetermined value, no driving force is generated from the additional electric motor of the second drive system and the power of the battery system can be supplied only to the electric motor of the first drive system. Therefore, even when the charged amount is low, the front and rear wheels reversing can be enabled.

According to Inventive-Aspect 12, when the charged amount is equal to or larger than the predetermined value, by causing at least the additional electric motor of the second drive system to generate the driving force therefrom, the load borne by the engine can be reduced, thereby increasing the energy efficiency.

According to Inventive-Aspect 13, when the charged amount is equal to or larger than the predetermined value, by stopping the engine, the energy efficiency can further be increased.

According to Inventive-Aspect 14, by controlling the power supply to the electric motor of the first drive system by the power supply controller, the driving of the electric motor of the first drive system can be performed appropriately in accordance with the condition of the battery system or the condition of the additional electric motor of the second drive system.

According to Inventive-Aspect 15, the generated power does not exceed the consumed power, and therefore, the flow of power into the battery when the battery temperature is low can be suppressed.

According to Inventive-Aspect 16, the generated power does not become short relative to the consumed power, and therefore, a desired driving force can be outputted by the electric motor of the first drive system.

According to Inventive-Aspect 17, the generated power by the additional electric motor of the second drive system becomes larger than the consumed power of the electric motor of the first drive system, and therefore, the battery system can be charged while a desired driving force is outputted by the electric motor of the first drive system.

According to Inventive-Aspect 18, the battery system can be charged when the battery system is in the low charged state, thereby maintaining the charged amount of the battery system in an appropriate range.

According to Inventive-Aspect 19, the electric motor of the first drive system can be driven without taking out power from the battery system.

According to Inventive-Aspect 20, by supplying only the generated power by the additional electric motor of the second drive system to the electric motor of the first drive system when the battery system is in the low charged condition, a further deterioration of the charged condition can be suppressed.

According to Inventive-Aspect 21, when the vehicle reverses, while the one-way power transmission unit may be engaged and the energy efficiency or the reverse running performance (the running through performance) may be deteriorated if the vehicle is reversed only by the reverse driving force of the second drive system, by prohibiting the reverse driving using only the reverse driving force of the second drive system, the one-way power transmission unit from is prevented from being engaged, and the deterioration of the energy efficiency or the reverse running performance can be suppressed.

BRIEF DESCRIPTION OF DRAWINGS

FIG. 5 is a table depicting states of a front-wheel-drive system, the rear-wheel-drive system, electric motors, a one-way clutch and hydraulic brakes in various vehicle conditions.

DETAILED DESCRIPTION

An embodiment will be described.

Figure 1:
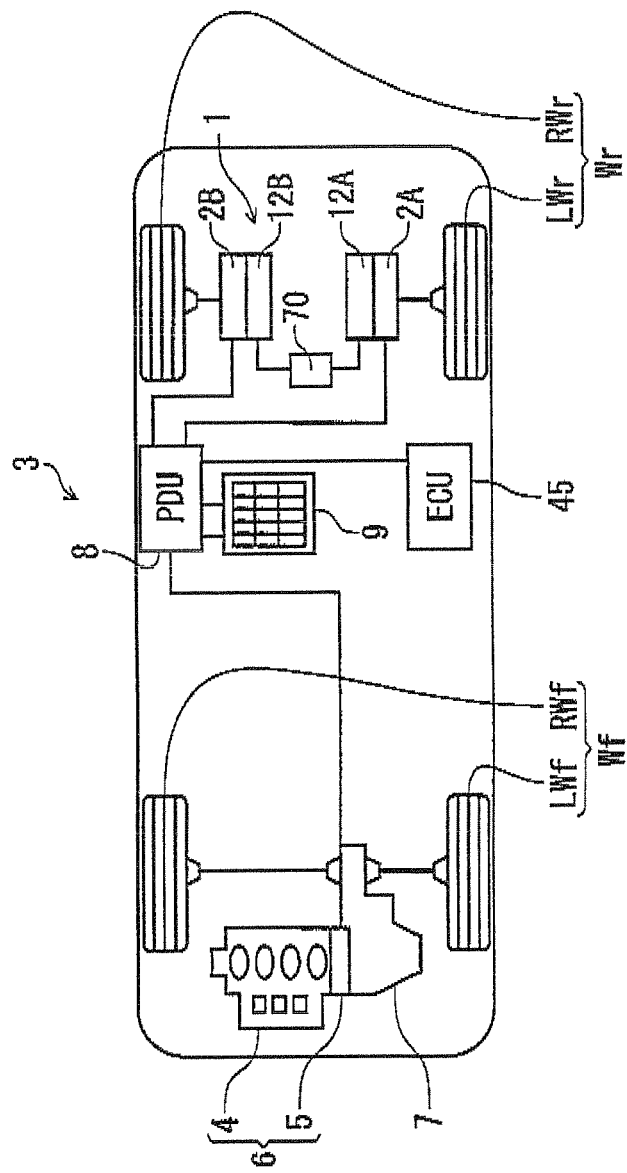
FIG. 1 illustrates a hybrid vehicle according to an embodiment is mounted.

As shown in FIG. 1, a front- and rear-wheel-drive vehicle (vehicle) 3 according to the embodiment is a hybrid vehicle having a drive system 6 (hereinafter, referred to as a front-wheel-drive system) in which an engine 4 and an electric motor 5 are connected in series at a front part of the vehicle. Power of the front-wheel-drive system 6 is designed to be transmitted to front wheels Wf (RWf, Lwf) via a transmission 7, while power of a drive system 1 (hereinafter, referred to as a rear-wheel-drive system) which is provided at a rear part of the vehicle separately from the front-wheel-drive system 6 is designed to be transmitted to rear wheels Wr (RWr, LWr). The electric motor 5 of the front-wheel-drive system 6 and electric motors 2A, 2B of the rear-wheel-drive system 1 on the rear wheel Wr side are connected to a battery 9 via a PDU 8 (Power Drive Unit), whereby power supply from the battery 9 and energy regeneration to the battery 9 are performed via the PDU 8. The PDU 8 is connected to an ECU 45. In this embodiment, while the drive system 1 is described as the rear-wheel-drive system and the drive system 6 as the front-wheel-drive system, the drive system 1 may be used as a front-wheel-drive system and the drive system 6 as a rear-wheel-drive system.

Figure 2:
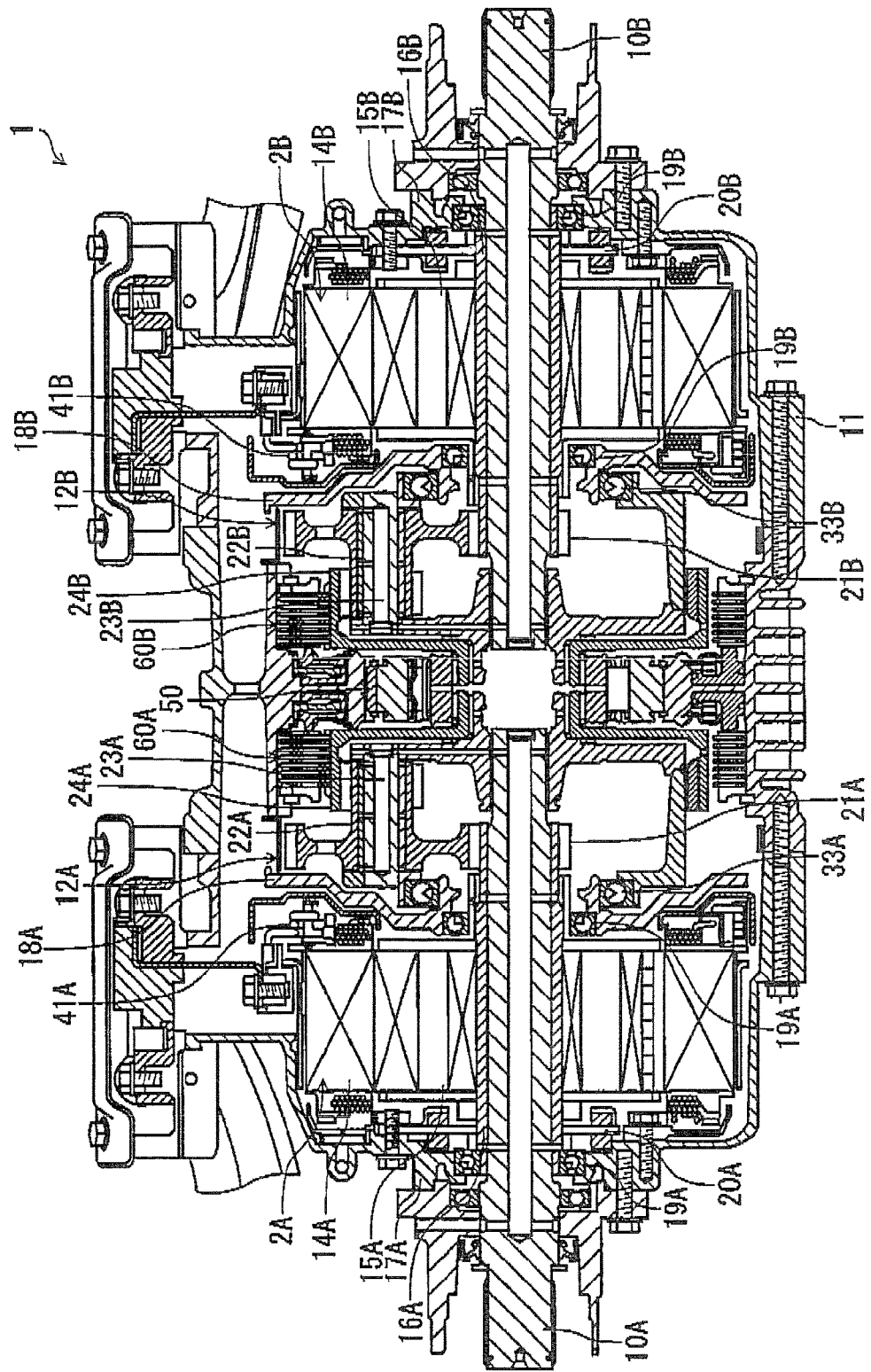
FIG. 2 cross-sectionally illustrates a rear-wheel-drive system of the embodiment.
Figure 3:
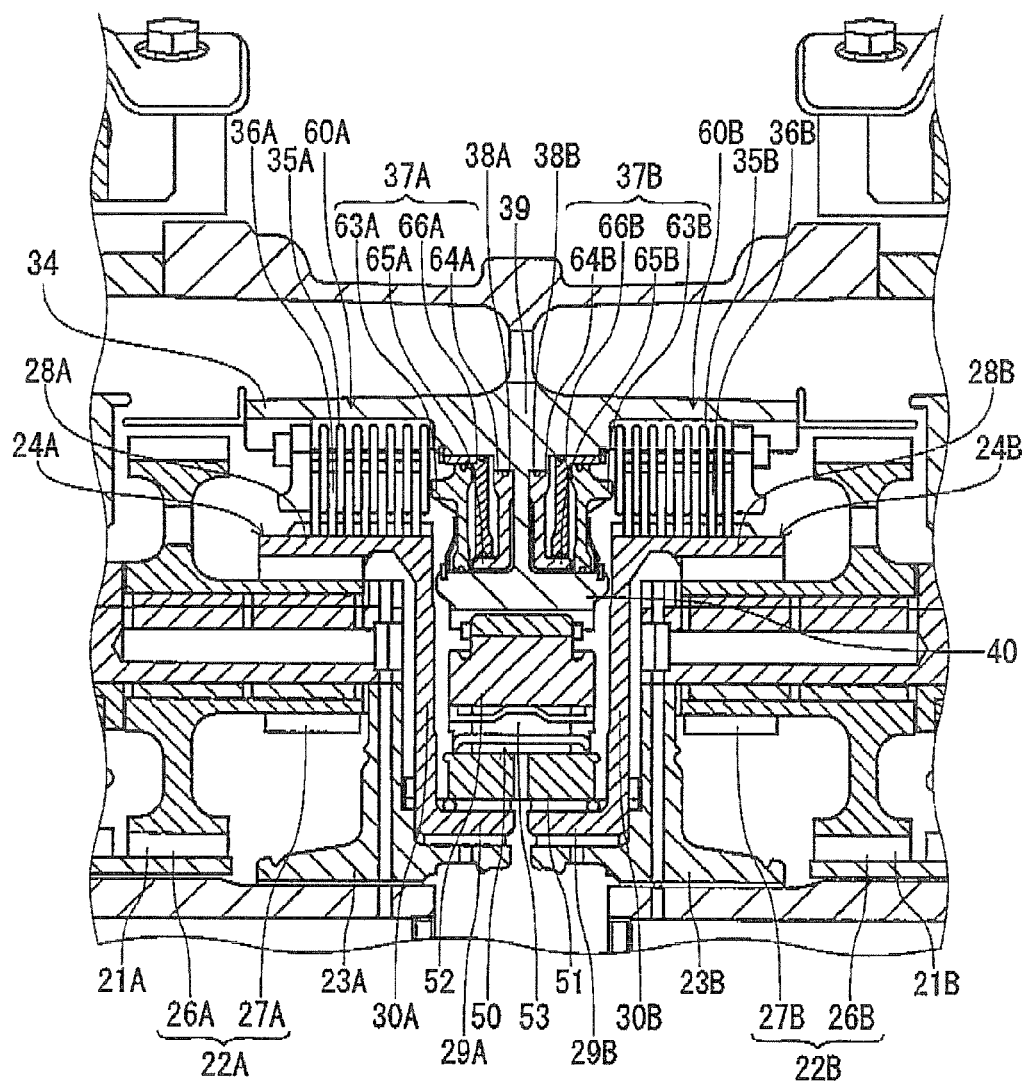
FIG. 3 enlargedly illustrates a part of FIG. 2.
Figure 4:
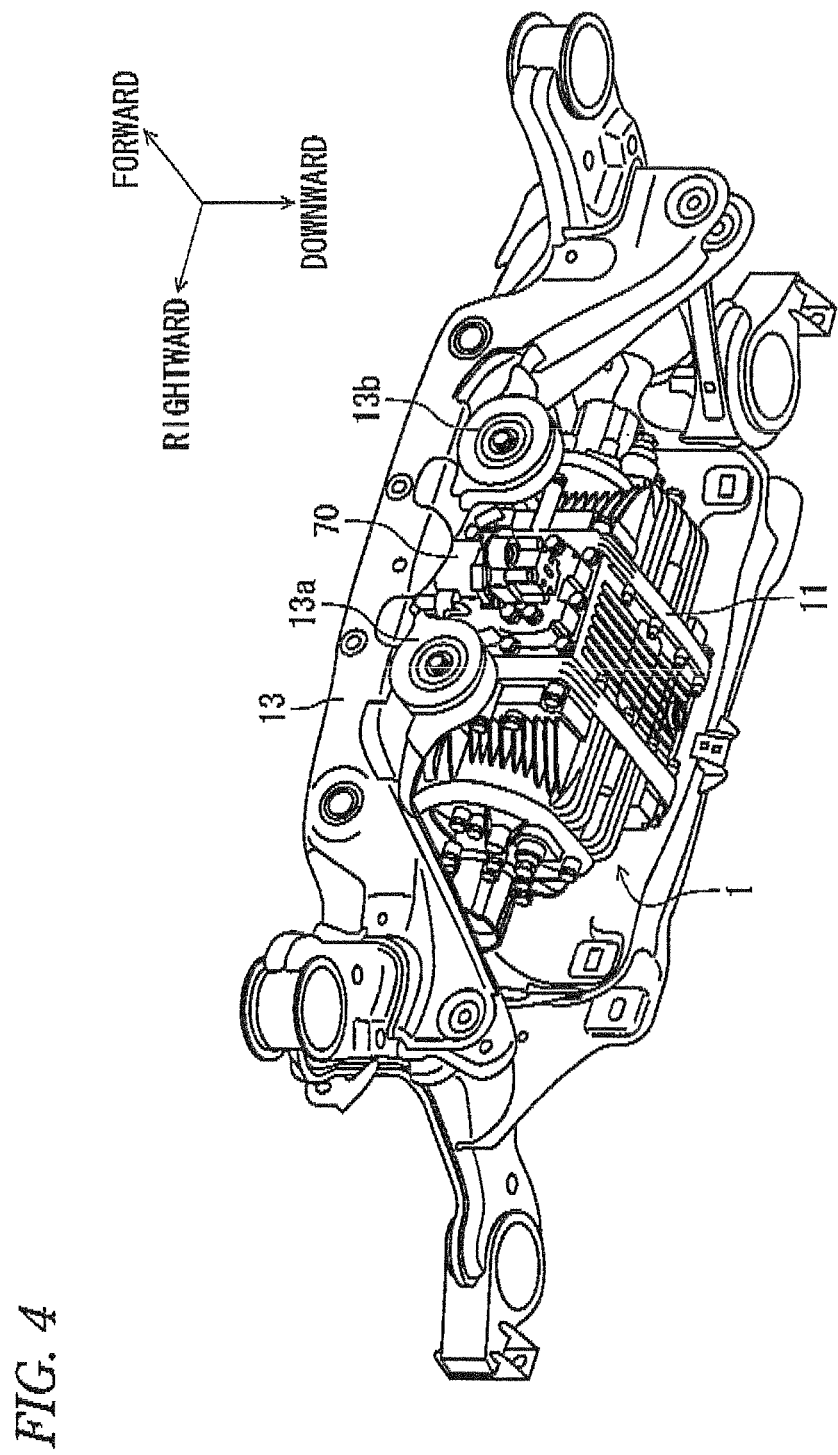
FIG. 4 illustrates a mounting state of the rear-wheel-drive system in a frame.

FIG. 2 cross-sectionally illustrates the rear-wheel-drive system 1. As shown in FIG. 2, left and right axles 10A, 10B are disposed coaxially in a vehicle width or transverse direction on the rear wheel Wr side of the vehicle. A reduction gear case 11 of the rear-wheel-drive system 1 has a substantially cylindrical shape. The axle driving electric motors 2A, 2B and planetary gear type reduction gears 12A, 12B which decelerate the driving rotations of the electric motors 2A, 2B are disposed coaxially with the axles 10A, 10B inside the reduction gear case 11. The electric motor 2A and the planetary gear type reduction gear 12A control a left rear wheel LWr, and the electric motor 2B and the planetary gear type reduction gear 12B control a right rear wheel RWr. The electric motor 2A and the planetary gear type reduction gear 12A and the electric motor 2B and the planetary gear type reduction gear 12B are disposed laterally symmetrically in the transverse direction. As shown in FIG. 4, the reduction gear case 11 is supported by support portions 13a, 13b of a frame member 13 which constitutes part of a frame which makes up a framework of the vehicle 3 and a frame of the rear-wheel-drive system 1, not shown. The support portions 13a, 13b are provided to the left and right of a center of the frame member 13 in the transverse direction. Arrows in FIG. 4 indicate directions of the vehicle in which the rear-wheel-drive system 1 is mounted.

Stators 14A, 14B of the electric motors 2A, 2B are fixed, respectively, to left and right end sides inside the reduction gear case 11, and annular rotors 15A, 15B are disposed rotatably on inner circumferential sides of the stators 14A, 14B. Cylindrical shafts 16A, 16B which surround outer circumferences of the axles 10A, 10B are connected, respectively, to inner circumferential portions of the rotors 15A, 15B. The cylindrical shafts 16A, 16B are supported in end portion walls 17A, 17B and intermediate walls 18A, 18B of the reduction gear case 11 via bearings 19A, 19B so as to rotate relatively and coaxially with the axles 10A, 10B. Resolvers 20A, 20B are provided on outer circumferences of one end portions of the cylindrical shafts 16A, 16B and in the end portion walls 17A, 17B of the reduction gear case 11 for feeding back information on rotational positions of the rotors 15A, 15B to a controller (not shown) for controlling the electric motors 2A, 2B.

The planetary gear type reduction gears 12A, 12B include sun gears 21A, 21B, pluralities of planetary gears 22A, 22B which mesh with the sun gears 21, planetary carriers 23A, 23 which support the planetary gears 22A, 22B and ring gears 24A, 24B which mesh with outer circumferential sides of the planetary gears 22A, 22B. Driving forces of the electric motors 2A, 2B are inputted from the sun gears 21A, 21B, and the decelerated driving forces are outputted through the planetary carriers 23A, 23B.

The sun gears 21A, 21B are formed integrally with the cylindrical shafts 16A, 16B. The planetary gears 22A, 22B are two-piece pinions having first pinions 26A, 26B having a large diameter and meshing direct with the sun gears 21A, 21B and second pinions 27A, 27B having a diameter smaller than that of the first pinions 26A, 26B. These first pinions 26A, 26B and second pinions 27A, 27B are formed integrally in such a state that they are disposed concentrically and are offset in an axial direction. The planetary gears 22A, 22B are supported on the planetary carriers 23A, 23B, and the planetary carriers 23A, 23B extend radially inwards at axially inner end portions so as to be spline fitted on the axles 10A, 10B. Thus, the planetary gears 22A, 22B are supported on the axles 10A, 10B so as to rotate together therewith and are supported on the intermediate walls 18A, 18B via bearings 33A, 33B.

The intermediate walls 18A, 18B separate an electric motor accommodation space for accommodating the electric motors 2A, 2B from a reduction gears space for accommodating the planetary gear type reduction gears 12A, 12B. The intermediate walls 18A, 18B are formed to be bent so as to expand an axial space defined therebetween from outside diameter or radially outer sides to inside diameter or radially inner sides thereof. The bearings 33A, 33B which support the planetary carriers 23A, 23B are disposed on the radially inner side of the intermediate walls 18A, 18B and the planetary gear type reduction gear 12A, 12B sides, and bus rings 41A, 41B for the stators 14A, 14B are disposed on the radially outer sides of the intermediate walls 18A, 18B and the electric motor 2A, 2B sides (refer to FIG. 2).

The ring gears 24A, 24B include gear portions 28A, 28B which mesh with the small-diameter second pinions 27A, 27B at inner circumferential surfaces, small-diameter portions 29A, 29B whose diameters are smaller than those of the gear portions 28A, 28B and which are disposed so as to face each other in an intermediate position in the reduction gear case 11 and connecting portions 30A, 30B which connect in a radial direction axially inner end portions of the gear portions 28A, 28B with axially outer end portions of the small-diameter portions 29A, 29B. In the case of this embodiment, the largest radii of the ring gears 24A, 24B are set to be smaller than the largest distances of the first pinions 26A, 26B from centers thereof. The small-diameter portions 29A, 29B are spline fitted in an inner race 51 of a one-way clutch 50, so that the ring gears 24A, 24B rotate together with the inner race 51 of the one-way clutch 50.

Incidentally, a cylindrical space portion is ensured between the reduction gear case 11 and the ring gears 24A, 24B. In the space portion, hydraulic brakes 60A, 60B, which constitute brake units for the ring gears 24A, 24B, are disposed so as not only to overlap the first pinions 26A, 26B in a radial direction but also to overlap the second pinions 27A, 27B in an axial direction. In the hydraulic brakes 60A, 60B, pluralities of fixed plates 35A, 35B which are splined fitted in an inner circumferential surface of a cylindrical radially outer side support portion 34 which extends in the axial direction on a radially inner side of the reduction gear case 11 and pluralities of rotating plates 36A, 36B which are splined fitted on outer circumferential surfaces of the ring gears 24A, 24B are disposed alternately in the axial direction, and these plates 35A, 35B, 36A, 36B are operated to be engaged and disengaged by annular pistons 37A, 37B. The pistons 37A, 37B are accommodated within annular cylinder compartments 38A, 38B between a lateral separation wall 39 which extends from the intermediate position to the radially inner side of the reduction gear case 11 and the radially outer side support portion 34 and a radially inner side support portion 40 which are connected together by the lateral separation wall 39 so as to advance and retreat freely therein. When a high-pressure oil is introduced into the cylinder compartments 38A, 38B, the pistons 37A, 37B are caused to advance, whereas when the high-pressure oil is discharged from the cylinder compartments 38A, 38B, the pistons 37A, 37B are caused to retreat. As shown in FIG. 4, the hydraulic brakes 60A, 60B are connected to an electric oil pump 70 which is disposed between the support portions 13a, 13b of the frame member 13 described above.

The pistons 37A, 37B have first piston walls 63A, 63B and second pistons 64A, 64B which are aligned sequentially in the axial direction, and these piston walls 63A, 63B, 64A, 64B are connected together by cylindrical inner circumferential walls 65A, 65B. Consequently, annular spaces which open towards the radially outer side are formed between the first piston walls 63A, 63B and the second piston walls 64A, 64B, and these annular spaces are divided laterally in the axial direction by partition members 66A, 66B which are fixed to inner circumferential surfaces of outer walls of the cylinder compartments 38A, 38B. Spaces between the lateral separation wall 39 of the reduction gear case 11 and the second piston walls 64A, 64B are made into first operation compartments S1 (refer to FIG. 5) into which the high-pressure oil is introduced directly, and spaces between the partition members 66A, 66B and the first piston walls 63A, 63B are made into second operation compartments S2 (refer to FIG. 5) which communicate with the first operation compartments S1 via through holes formed in the inner circumferential walls 65A, 65B. Spaces between the second piston walls 64A, 64b and the partition members 66A, 66B communicate with the atmospheric pressure.

In the hydraulic brakes 60A, 60B, oil is introduced into the first operation compartment S1 and the second operation compartment 52 from hydraulic circuits, not shown, whereby the fixed plates 35A, 35B and the rotating plates 36A, 36B can be pressed against each other by virtue of the pressure of the oil which acts on the first piston walls 63A, 63B and the second piston walls 64A, 64B. Consequently, a large pressure bearing surface can be produced by the first and second piston walls 63A, 63B, 64A, 64B which are aligned laterally in the axial direction, and therefore, a large pressing force or pressure can be obtained which acts on the fixed plates 35A, 35B and the rotating plates 36A, 36B while suppressing an increase in radial areas of the pistons 37A, 37B.

In the case of the hydraulic brakes 60A, 60B, the fixed plates 35A, 35B are supported on the radially outer side support portion 34 which extend from the reduction gear case 11, while the rotating plates 36A, 36B are supported on the ring gears 24A, 24B. Therefore, when both the plates 35A, 35B, 36A, 36B are pressed against each other by the pistons 37A, 37B, braking forces are applied to the ring gears 24A, 24B by friction engagement between both the plates 35A, 35B, 36A, 36B to thereby make the ring gears 24A, 24B stationary. On the other hand, when the engagement of the plates 35A, 35B, 36A, 36B by the pistons 37A, 37B is released, the ring gears 24A, 24B are allowed to rotate freely.

In addition, a space is ensured between the connecting portions 30A, 30B of the ring gears 24A, 24B which face each other in the axial direction. The one-way clutch 50 is disposed in the space, and the one-way clutch 50 transmits power to the ring gears 24A, 24B only in one direction and cuts off power in the other direction. The one-way clutch 50 is such that a number of sprags 53 are interposed between the inner race 51 and an outer race 52, and the inner race 51 is designed to rotate together with the small-diameter portions 29A, 29B of the ring gears 24A, 24B through spline fitting. In addition, the outer race 52 is positioned and prevented from rotating by the radially inner side support portion 40. The one-way clutch 50 is applied when the vehicle 3 moves forwards by the power of the electric motors 2A, 2B so as to lock the rotation of the ring gears 24A, 24B. More specifically, the one-way clutch 50 is applied or engaged when rotational power in a forward direction (a rotating direction when the vehicle 3 is advanced) on the electric motors 2A, 2B side is inputted into the rear wheels Wr side and is released or disengaged when rotational power in a reverse direction on the electric motors 2A, 2B side is inputted into the rear wheels Wr side. In addition, the one-way clutch 50 is disengaged when rotational power in the forward direction on the rear wheel Wr side is inputted into the electric motors 2A, 2B side and is engaged when rotational power in the reverse direction on the rear wheels Wr side is inputted into the electric motors 2A, 2B side.

In this way, in the rear-wheel-drive system 1 of the embodiment, the one-way clutch 50 and the hydraulic brakes 60A, 60B are provided side by side on a power transmission line between the electric motors 2A, 2B and the rear wheels Wr.

The hydraulic brakes 60 are connected to the hydraulic circuits, not shown, so as to be controlled into a disengaged state, a slightly engaged state, and an engaged state by virtue of the pressure of oil supplied from the oil pump 70 via the hydraulic circuits in accordance with the running conditions of the vehicle or the engagement and disengagement of the one-way clutch 50.

Here, the ECU 45 (refer to FIG. 1) is a control unit for governing various controls performed in the vehicle as a whole. Vehicle speed, steering angle, acceleration pedal position AP, gear shift position, and state of charge (hereinafter, referred to as SOC from time to time) are inputted into the ECU 45, while signals which control the engine 4, signals which control the electric motors 2A, 2B, signals signaling charged state/discharged state in the battery 9, signals which control the hydraulic circuits (not shown), and signals which control the electric oil pump 70 are outputted from the ECU 45.

Namely, the ECU 45 includes, at least, a function as an advance/reverse control unit (an advance control unit when the vehicle advances and a reverse control unit when the vehicle reverses) for determining whether a front-wheel drive by the front-wheel-drive system 6, a rear-wheel drive by the rear-wheel-drive system 1 or a four-wheel drive by the front-wheel-drive system 6 and the rear-wheel-drive system 1 is performed, a function as a motor controller for controlling the electric motors 2A, 2B, a function as an engagement/disengagement controller for controlling the hydraulic brakes 60A, 60B as engagement/disengagement units, a function as a front-wheel drive control unit for controlling the engine 4 and the electric motor 5 and a function as a power supply controller for controlling a power supply between the battery 9 and the electric motors 2A, 2B and a power supply between the electric motors 2A, 2B and the electric motor 5.

FIG. 5 is a table depicting states of the front-wheel-drive system 6, the rear-wheel-drive system 1, the electric motors 2A, 2B, the one-way clutch 50 and the hydraulic brakes 60A, 60B in various vehicle conditions. In the figure, a front unit denotes the front-wheel-drive system 6, a rear unit denotes the rear-wheel-drive system 1, a rear motor denotes the electric motors 2A, 2B, OWC denotes the one-way clutch 50, and BRK denotes the hydraulic brakes 60A, 60B. FIGS. 6 to 11 are speed collinear graphs of the rear-wheel-drive system 1 in the various vehicle conditions. In the figures, S, C on the left-hand side denote the sun gear 21A of the planetary gear type reduction gear 12A connected to the electric motor 2A and the planetary carrier 23A connected to the axle 10A, respectively. S, C on the right-hand side denote the sun gear 21B of the planetary gear type reduction gear 123 connected to the electric motor 23 and the planetary carrier 23B connected to the axle 10B, respectively. R denotes the ring gears 24A, 24B, BRK denotes the hydraulic brakes 60A, 60B, and OWC denotes the one-way clutch 50. In the following description, the rotating direction of the sun gears 21A, 2B when the vehicle advances using the power of the electric motors 2A, 2B is referred to as a forward direction. In the figures, an upper part above a horizontal line denoting that the vehicle is at halt denotes rotations in the forward direction, while a lower part below the horizontal line denotes rotations in a reverse direction. Upward arrows denote torque in the forward direction, and downward arrows denoted torque in the reverse direction.

Figure 6:
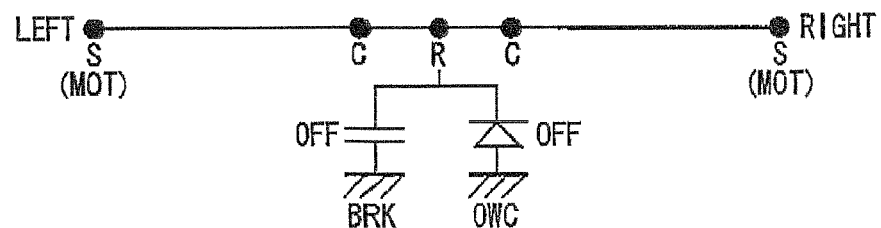
FIG. 6 is a speed collinear graph of the rear-wheel-drive system when the vehicle is at halt.

Neither the front-wheel-drive system 6 nor the rear-wheel-drive system 1 is driven when the vehicle is at halt. Consequently, As shown in FIG. 6, the electric motors 2A, 2B are both stopped, and the axles 10A, 10B are also stopped. Therefore, no torque is generated in any of the constituent elements.

When the vehicle is at halt, the hydraulic brakes 60A, 60B are released (OFF). In addition, the one-way clutch 50 is not engaged (OFF) because the electric motors 2A, 2B are not driven.

Figure 7:
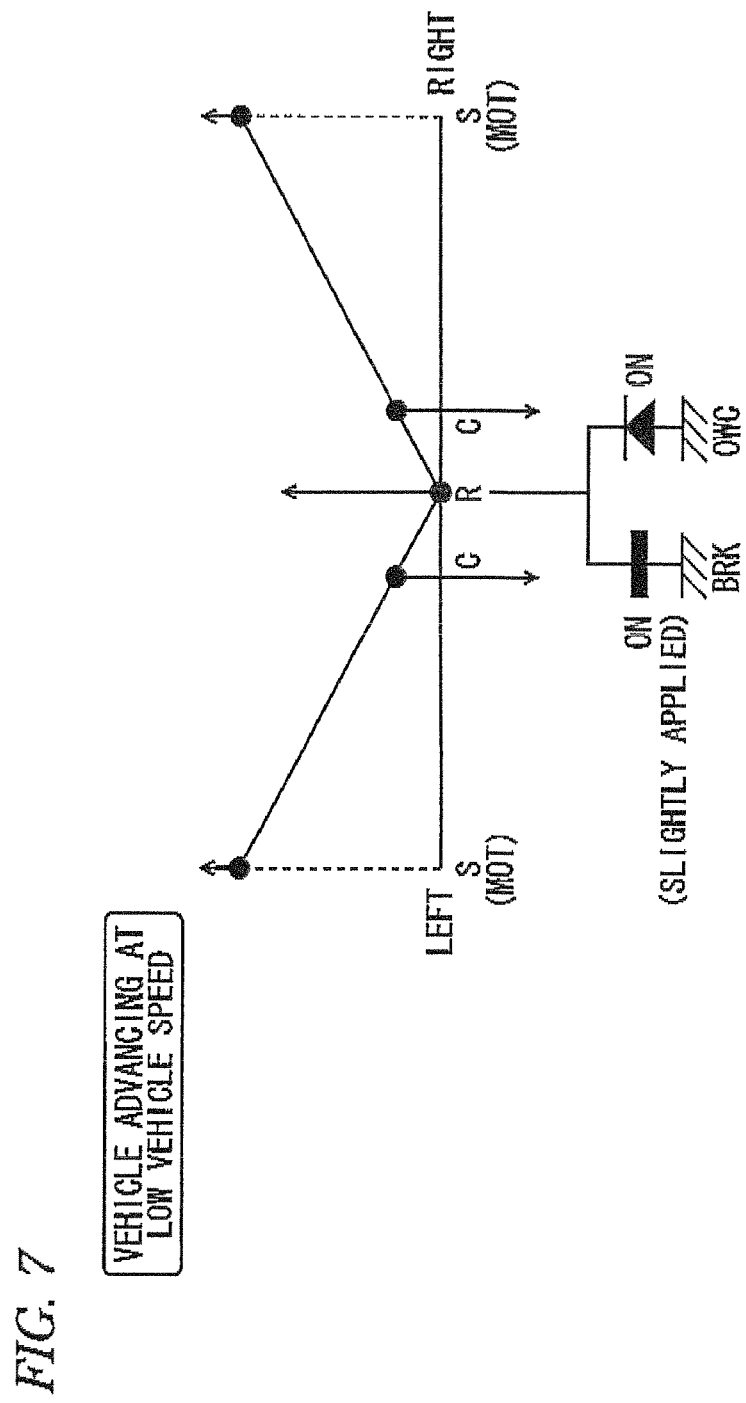
FIG. 7 is a speed collinear graph of the rear-wheel-drive system when the vehicle is moving forwards at low speeds.

When the vehicle is advancing at low speeds with a good motor efficiency as when an EV start or EV cruising is performed after the ignition is turned on, a rear-wheel drive is effected by the rear-wheel-drive system 1. As shown in FIG. 7, when the electric motors 2A, 2B are power driven to rotate in the forward direction, a torque in the forward direction is added to the sun gears 21A, 21B. As this occurs, as has been described above, the one-way clutch 50 is engaged, and the ring gears 24A, 24B are locked. By the ring gears 24A, 24B being so locked, the planetary carriers 23A, 23B rotate in the forward direction, whereby the vehicle advances. Running resistance from the axles 10A, 10B is applied to the planetary carriers 23A, 23B in the reverse direction. In this way, when the vehicle is started from a standstill, the ignition is turned on to increase the torque of the electric motors 2A, 2B, whereby the one-way clutch is engaged mechanically, and the ring gears 24A, 24B are locked.

As this occurs, the hydraulic brakes 60A, 60B are controlled to be put into a slightly engaged state. When rotational power in the forward direction of the electric motors 2A, 2B is inputted into the rear wheel Wr side, the one-way clutch 50 is engaged, whereby power can be transmitted by the one-way clutch 50 only. However, by keeping also the hydraulic brakes 60A, 60B, which are provided parallel to the one-way clutch 50, in the slightly engaged state so as to keep the electric motors 2A, 2B side connected with the rear wheels Wr side, even when the rotational power in the forward direction inputted from the electric motors 2A, 2B side is decreased temporarily to thereby put the one-way clutch 50 in the disengaged state, the occurrence of a condition still can be suppressed in which the power transmission between the electric motors 2A, 2B side and the rear wheels Wr side is disabled. In addition, a rotation speed control to connect the electric motors 2A, 2B side with the rear wheels Wr side when shifted to a decelerating regeneration is made unnecessary. The application force of the hydraulic brakes 60A, 60B that is weaker than the application force thereof when the decelerating regeneration is performed or the vehicle is reversing. By making the application force of the hydraulic brakes 60A, 60B when the one-way clutch 50 is engaged weaker than the application force of the hydraulic brakes 60A, 60B when the one-way clutch 50 is disengaged, the consumed power when the hydraulic brakes 60A, 60B are applied is decreased.

Figure 8:
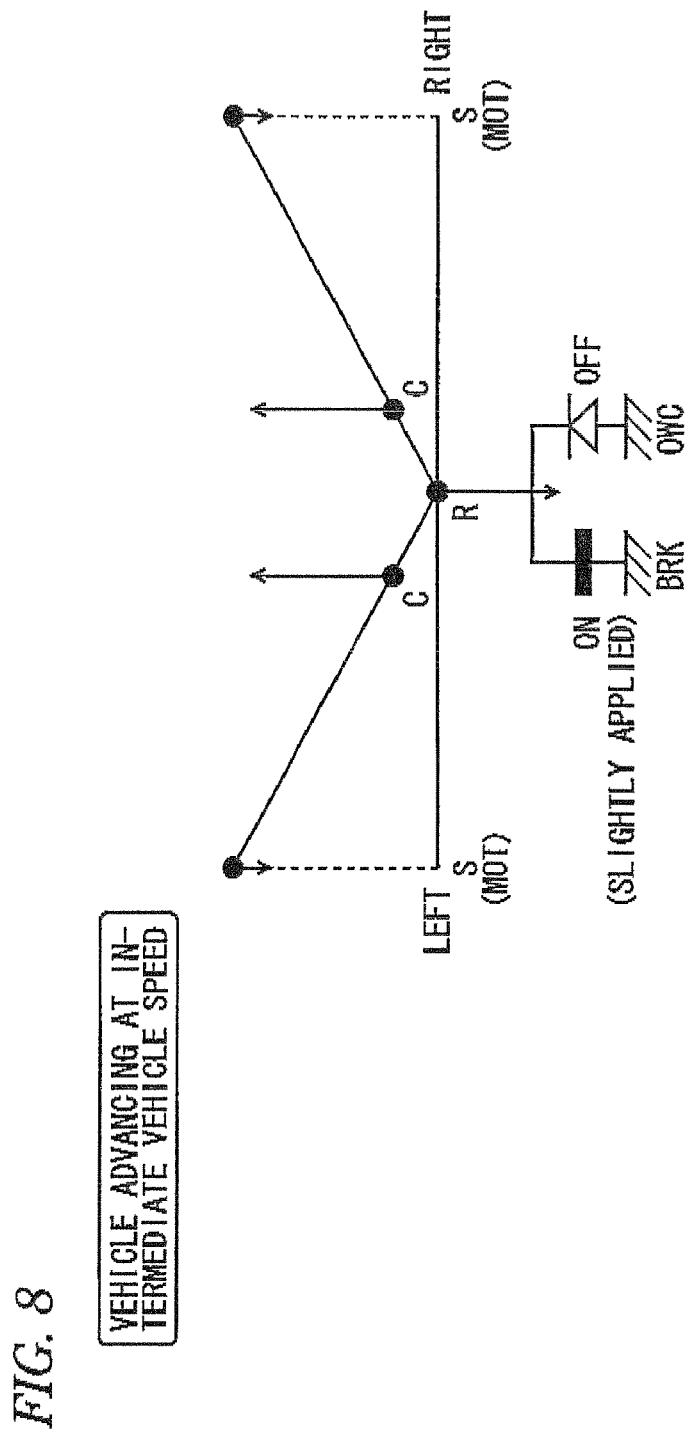
FIG. 8 is a speed collinear graph of the rear-wheel-drive system when the vehicle is moving forwards at intermediate speeds.

When the vehicle speed increases from the state in which the vehicle advances at low speeds to reach a state in which the vehicle advances at intermediate speeds, the rear-wheel drive by the rear-wheel-drive system 1 is shifted to the front-wheel drive by the front-wheel-drive system 6. As shown in FIG. 8, when the power drive of the electric motors 2A, 2B is stopped, the torque in the forward direction which attempts to advance the vehicle is applied to the planetary carriers 23A, 23B from the axles 10A, 10B. Therefore, as has been described before, the one-way clutch 50 is disengaged.

As this occurs, the hydraulic brakes 60A, 60B are controlled to be put into the slightly engaged state. When the rotational power in the forward direction on the rear wheels Wr side is inputted into the electric motors 2A, 2B side, the one-way clutch 50 is disengaged, and the power transmission cannot be performed by the one-way clutch 50 only. However, the hydraulic brakes 60A, 60B, which are provided parallel to the one-way clutch 50, are engaged slightly so that the electric motors 2A, 2B side is kept connected with the rear wheels Wr side, whereby the state in which power is transmitted therebetween can be maintained. Thus, the rotation speed control which would otherwise be required when shifted to the decelerating regeneration is made unnecessary. The application force of the hydraulic brakes 60A, 60B that is weaker than the application force when the decelerating regeneration is performed or the vehicle reverses.

Figure 9:
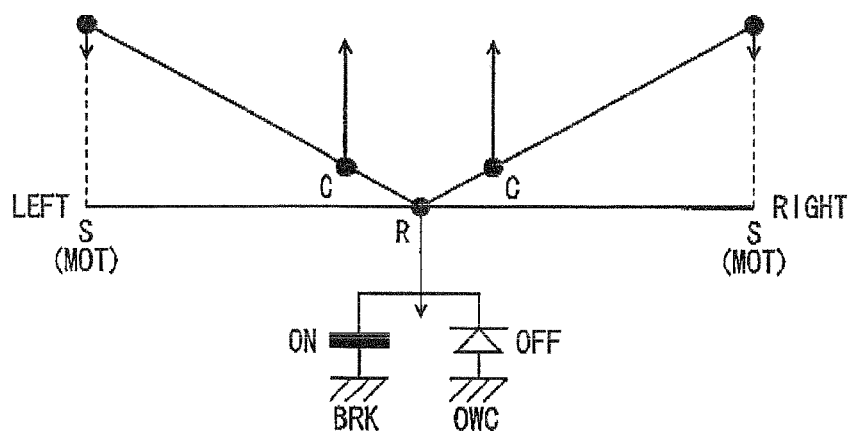
FIG. 9 is a speed collinear graph of the rear-wheel-drive system during a decelerating regeneration.

When attempting to drive the electric motors 2A, 2B for regeneration from the state shown in FIG. 7, As shown in FIG. 9, the torque in the forward direction which attempts to keep the vehicle advancing is applied to the planetary carriers 23A, 23B from the axles 10A, 10B, whereby the one-way clutch 50 is disengaged.

As this occurs, the hydraulic brakes 60A, 60B are controlled so as to be put in an applied state (ON). Consequently, the ring gears 24A, 24B are fixed, and a regenerative braking torque in the reverse direction is applied to the electric motors 2A, 2B, whereby a decelerating regeneration is performed at the electric motors 2A, 2B. When the rotational power in the forward direction on the rear wheels Wr side is inputted into the electric motors 2A, 2B side, the one-way clutch 50 is disengaged. Although the power cannot be transmitted by the one-way clutch 50 only, the hydraulic brakes 60A, 60B, which are provided parallel to the one-way clutch 50, are applied so as to keep the electric motors 2A, 2B side connected with the rear wheels Wr side, whereby the state in which the power is transmitted therebetween can be maintained. Then, when the electric motors 2A, 2B are controlled to be driven for regeneration, the vehicle energy can be regenerated.

Following this when the vehicle is accelerated, the four-wheel drive is performed by the front-wheel-drive system 6 and the rear-wheel-drive system 1, and the rear-wheel-drive system 1 is put in the same state as the state shown in FIG. 7 which results when the vehicle is running at low speeds.

Figure 10:
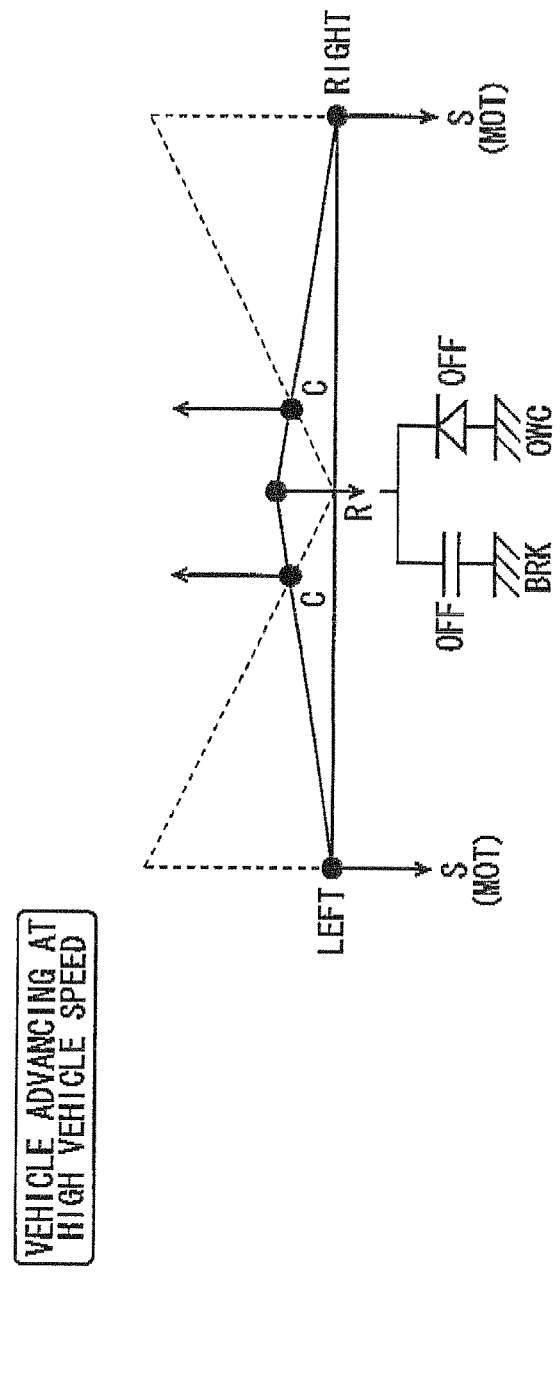
FIG. 10 is a speed collinear graph of the rear-wheel-drive system when the vehicle is moving forwards at high speeds.

When the vehicle is advancing at high speeds, the front-wheel drive by the front-wheel-drive system 6 is performed. As shown in FIG. 10, when the electric motors 2A, 2B stop power drive, the torque in the forward direction which attempts to advance the vehicle is applied to the planetary carriers 23A, 23B from the planetary gears, and therefore, as has been described before, the one-way clutch 50 is disengaged.

As this occurs, the hydraulic brakes 60A, 60B are controlled to be put in the released state (OFF). Consequently, the concurrent rotation of the electric motors 2A, 2B is prevented, whereby the excessive rotation of the electric motors 2A, 2B is prevented when the vehicle is driven at high speeds by the front-wheel-drive system 6.

Next, a reverse running of the vehicle 3 of the embodiment will be described in detail.

As a method for reversing the vehicle 3, it is considered from the mechanism of the front- and rear-wheel-drive vehicle to perform the front-wheel drive by the front-wheel-drive system 6, the rear-wheel drive by the rear-wheel-drive system 1, or the four-wheel drive by the front-wheel-drive system 1 and the rear-wheel-drive system 1. However, since the one-way clutch 50 is engaged when the rotational power in the reverse direction on the rear wheels Wr side is inputted into the electric motors 2A, 2B side, when the vehicle is reversed by effecting the front-wheel drive by the front-wheel-drive system 6, the electric motors 2A, 2B are rotated concurrently, the vehicle energy efficiency may be deteriorated by the friction of the electric motors 2A, 2B or the reverse running performance (the running through performance) may be deteriorated. Then, in the embodiment, when the vehicle is reversed, a reverse driving force is generated at least in the rear-wheel-drive system 1 to reverse the vehicle.

In other words, the vehicle is reversed by effecting the rear-wheel drive by the rear-wheel-drive system 1 (hereinafter, also, referred to as a rear wheels reversing state) or the four-wheel drive by the front-wheel-drive system 6 and the rear-wheel-drive system 1 (hereinafter, also, referred to as front and rear wheels reversing state), and the reverse-drive using only the driving force of the front-wheel-drive system 6 is prohibited.

Figure 11:
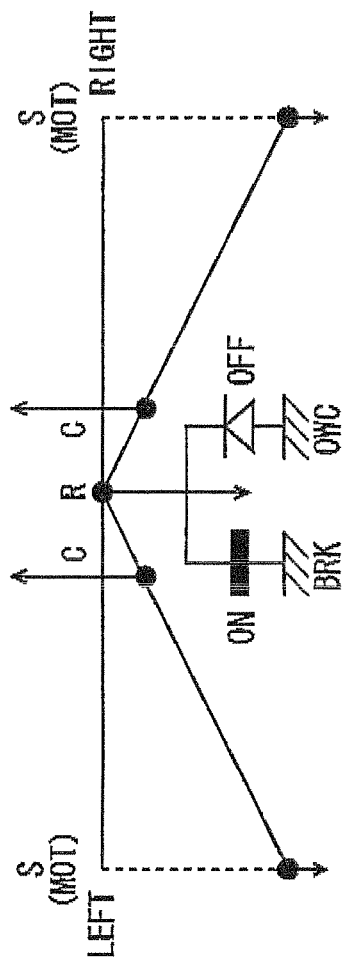
FIG. 11 is a speed collinear graph of the rear-wheel-drive system when the vehicle is reversing.

Consequently, when reversing the vehicle, the reverse driving force is generated at least in the rear-wheel-drive system 1 to reverse the vehicle. Therefore, when the electric motors 2A, 2B are power driven reversely, As shown in FIG. 11, a torque in the reverse direction is applied to the sun gears 21A, 21B. As this occurs, the one-way clutch 50 is disengaged, and the hydraulic brakes 60A, 60B are controlled so as to be applied. Consequently, the ring gears 24A, 24B are fixed, and the planetary carriers 23A, 23B rotate in the reverse direction, whereby the vehicle is allowed to reverse. As this occurs, the running resistance is being applied to the planetary carriers 23A, 23B from the axles 10A, 10B.

The ECU 45, which functions as the advance/reverse control unit, is preferably designed to acquire information from a road surface condition acquiring unit 81, a reverse intention acquiring unit, a slip condition acquiring unit 82, a charged condition acquiring unit 83, and a battery system temperature acquiring unit 84 and controls the switching between the rear wheels reversing state and the front and rear wheels reversing state based on the inclined state and friction state of the road surface which is acquired from the road surface condition acquiring unit 81 and the slip condition of the road surface which is acquired from the slip condition acquiring unit 82. The ECU 45 controls the engine 4 and the electric motor 5 of the front-wheel-drive system 6 in accordance with SOC of the battery 9 which is acquired from the charged state acquiring unit when the vehicle is reversed in the front and rear wheels reversing state or the rear wheels reversing state and controls the power generating amount of the electric motor 5 of the front-wheel-drive system 6 in accordance with the temperature of the battery 9 which is acquired from the battery system temperature acquiring unit 84. "Acquiring" is a concept which includes acquiring by both "estimation" and "detection."

Here, the road surface condition acquiring unit 81 is designed to acquire an inclined state of the road surface from position information received from an inclination sensor, not shown, or a GPS and map data stored in a memory. The road surface condition acquiring unit 81 is also designed to acquire further a friction condition of the road surface from a driving force detection unit for detecting a driving force of the drive wheels (the front wheels Wf when the vehicle is advancing, and the rear wheels Wr when the vehicle is reversing, and front and rear wheels Wf, Wr when the vehicle is running based on the four-wheel drive, a slip rate detection unit for detecting a slip rate of the drive wheels, and a μ detection unit for detecting a μ (friction coefficient) of the road surface based on a correlation between the driving force and slip rate of the drive wheels.

The slip condition acquiring unit 82 calculates a speed difference between the front wheels Wf and the rear wheels Wr, for example, from wheel speed sensors which are provided individually on the wheels. Then, when the speed difference detected is equal to or smaller than a predetermined threshold, the slip condition acquiring unit 82 determines that there is occurring no slip. On the contrary, when the speed difference detected exceeds the threshold, the slip condition acquiring unit 82 determines that there is occurring a slip. Thus, the slip condition of the vehicle 3 is detected. The reverse intention acquiring unit determines whether or not the driver intends to reverse the vehicle by determining whether or not the gear shift lever is in the reverse position. The charged condition acquiring unit 83 is a known detector which is provided in the battery 9 to detect a charged condition (charged amount) or a residual capacity of the battery 9. The battery system temperature acquiring unit 84 is a detector provided in the battery 9 to detect a battery temperature.

Next, a control flow when the vehicle reverses will be described by reference to FIG. 12.

Firstly, whether or not the gear shift lever is in the reverse (Rvs) position is detected (S11). If it is determined as the result of the detection that the gear shift lever is not in the reverse position, the operation ends. On the contrary, if it is determined that the gear shift lever is in the reverse position, the ECU 45 prohibits the front-wheel drive by the front-wheel-drive system 6 (S12), and the flow proceeds to a road surface inclination determining operation (S13). In the road surface inclination determining operation (S13), the ECU 45 detects whether or not a slope angle acquired from the road surface condition acquiring unit 81 is equal to or smaller than a predetermined value (S13). If it is determined from the result of the determination that the slope angle is not equal to or smaller than the predetermined value, that is, the slop angle is larger than the predetermined value, the flow proceeds to an SOC determining operation (S14). On the other hand, if it is determined that the slope angle is equal to or smaller than the predetermined value, that is, the road surface is flat, the flow proceeds to a road surface frictional condition acquiring operation (S15).

In the road surface frictional condition acquiring operation (S15), slipperiness is determined from a μ acquired from the road surface condition acquiring unit 81, and if it is determined that the road surface is slippery, the flow proceeds to the SOC determining operation (S14). On the other hand, if it is determined that the road surface is not slippery, in the event that the engine 4 is in operation, the engine 4 is stopped (ENG stopped), whereas in the event that the engine 4 is not in operation, the stopped state of the engine 4 is maintained (ENG stopped) (S16), and the vehicle reverses in the rear wheels reversing state in which the vehicle is reversed by the electric motors 2A, 2B (the rear motors) of the rear-wheel-drive system 1 (S17). While the vehicle is reversing in the rear wheels reversing state, a slip condition determining operation (S18) is performed. In the slip condition determining operation (S18), if a slip is detected based on a slip condition acquired from the slip condition acquiring unit 82, the flow proceeds to the SOC determining operation (S14). If no slip condition is detected, the rear wheels reversing state is maintained.

In the SOC determining operation (S14), the ECU 45 determines whether or not SOC is equal to or larger than a predetermined value. If it is determined that SOC is not equal to or larger than the predetermined value, that is, SOC is smaller than the predetermined value, the vehicle reverses in the front and rear wheels reversing state (AWD reversing) by the engine 4 of the front-wheel-drive system 6 and the electric motors 2A, 2B of the rear-wheel-drive system 1 (S19). On the other hand, if it is determined that SOC is equal to or larger than the predetermined value, the vehicle reverses in the front and rear wheels reversing state (AWD reversing) by the electric motor 5 of the front-wheel-drive system 6 and the electric motors 2A, 2B of the rear-wheel-drive system 1 (S20).

Figure 12:
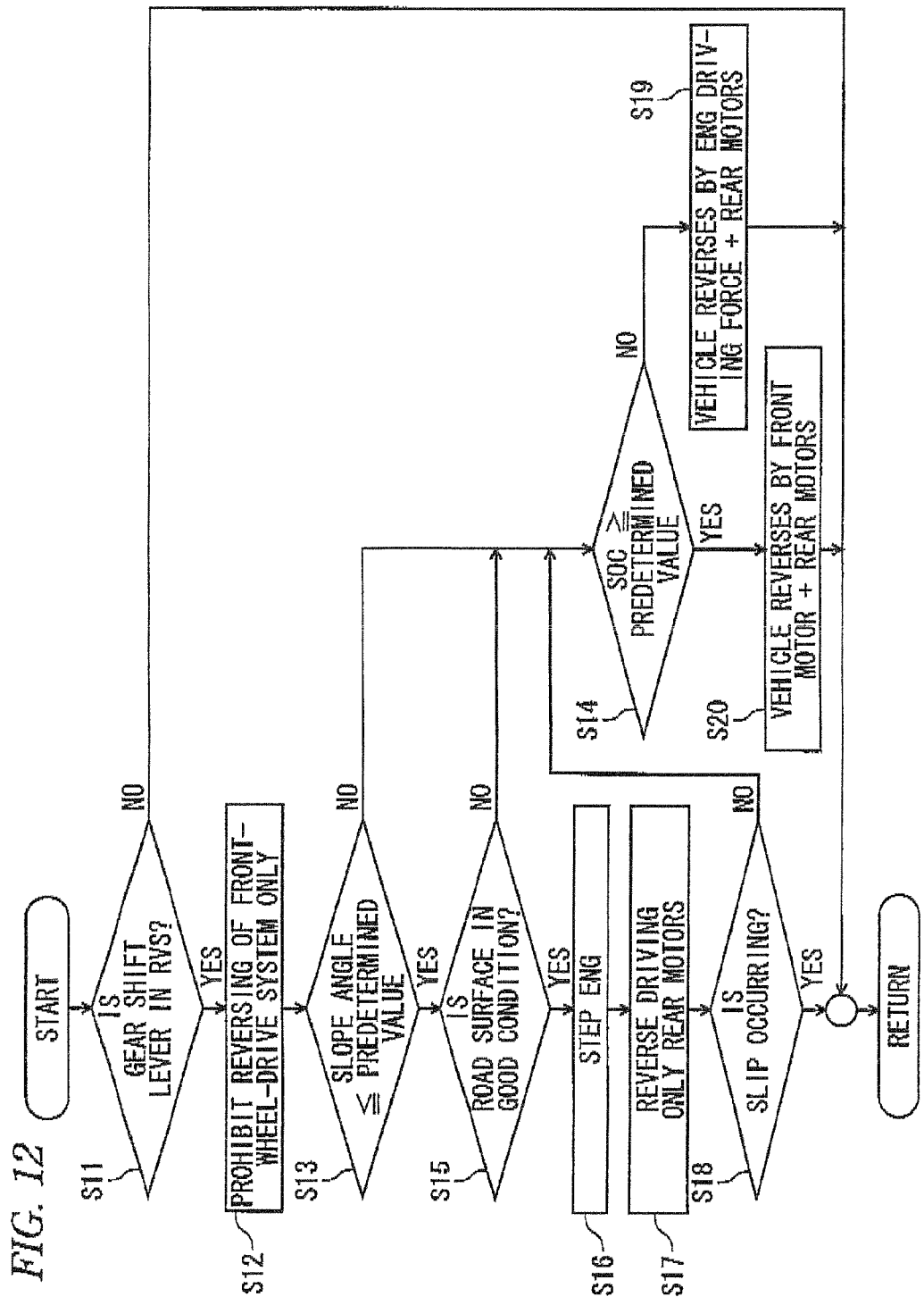
FIG. 12 is a flowchart showing a control flow when the vehicle is reversing.

The invention is not necessarily limited to the control flow depicted in FIG. 12. For example, the flow only has to include either the road surface frictional condition determining operation in S15 or the slip condition determination in S18. Further, S12, S15, S16, S18 can also be omitted.

Figure 13:
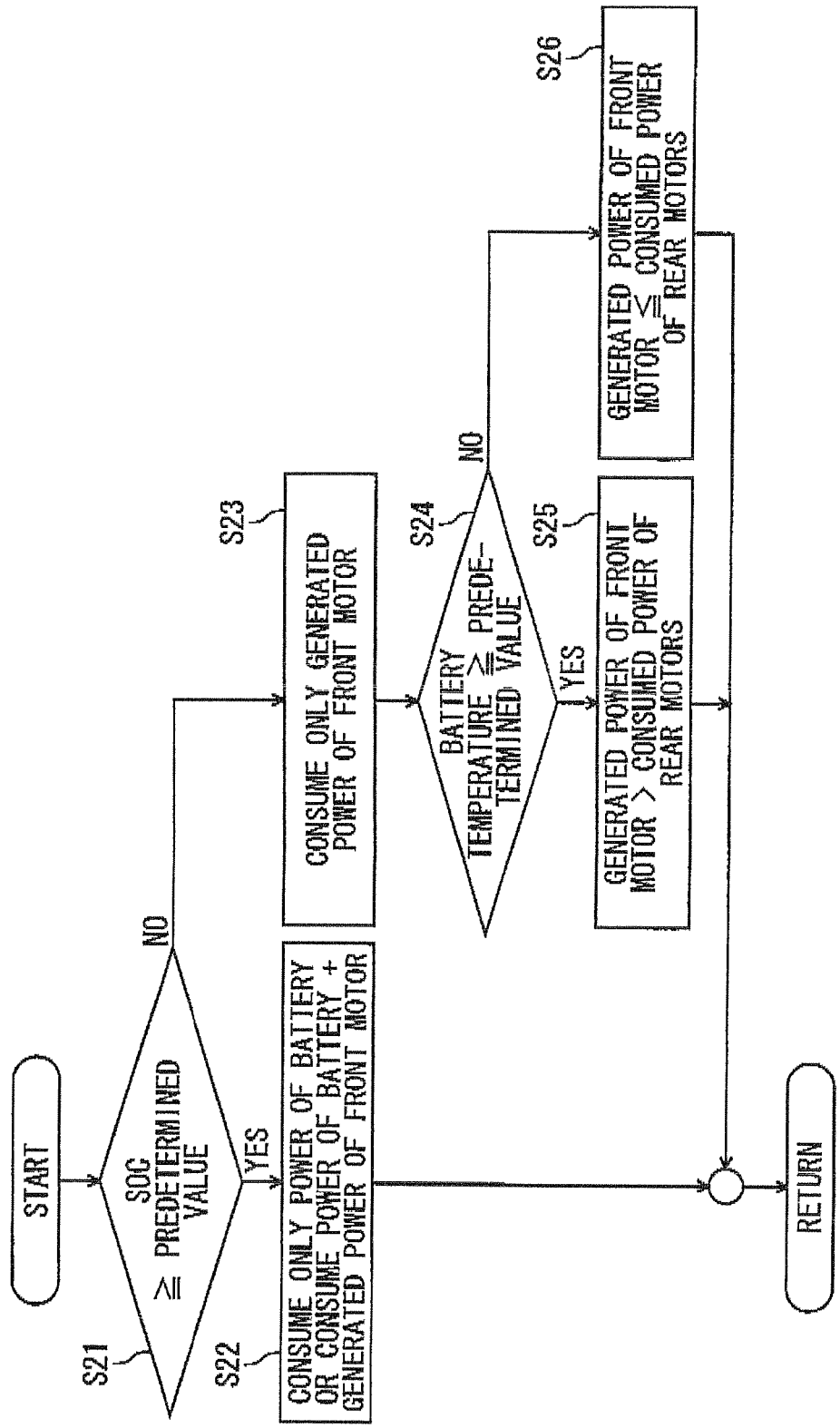
FIG. 13 is a flowchart showing a power control flow when the vehicle is being reversed by driving rear wheels.

Next, a power control in the rear wheels reversing state (S17) will be described by reference to FIG. 13.

Firstly, in an SOC determining operation (S21), the ECU 45 determines whether or not SOC is equal to or larger than a predetermined value. If it is determined that SOC is equal to or larger than the predetermined value, the electric motors 2A, 2B of the rear-wheel-drive system 1 are driven by consuming only power from the battery 9 or power resulting from addition of the power from the battery 9 to power generated by the electric motor 5 of the front-wheel-drive system 6 (S22).

On the other hand, if it is determined that SOC is smaller than the predetermined value (a low charged condition), the electric motors 2A, 2B are driven by consuming only the power generated by the electric motor 5 of the front-wheel-drive system 6 (S23). The predetermined value used in the SOC determining operation (S21) differs from the predetermined value used in the SOC determining operation (S14). Following this, a battery 9 temperature detecting operation is performed (S24). If it is determined from the result of the detection that the battery temperature is equal to or larger than a predetermined value, the generated power which is supplied from the electric motor 5 of the front-wheel-drive system 6 to the electric motors 2A, 2B of the rear-wheel-drive system 1 is controlled so as to be larger than the consumed power by the electric motors 2A, 2B of the rear-wheel-drive system 1 (S25). By this setting, power resulting from subtracting the consumed power by the electric motors 2A, 2B of the rear-wheel-drive system 1 from the generated power of the electric motor 5 of the front-wheel-drive system 6 is stored in the battery 9.

On the other hand, if it is determined from the result of the temperature detecting operation (S24) that the battery temperature is lower than the predetermined value (a low battery system temperature), the generated power which is supplied from the electric motor 5 of the front-wheel-drive system 6 to the electric motors 2A, 2B of the rear-wheel-drive system 1 is controlled so as not to exceed the consumed power by the electric motors 2A, 2B of the rear-wheel-drive system 1 (S25). By this setting, a drawback occurring in the battery 9 when the temperature thereof is low can be prevented. As this occurs, it is preferably controlled so that the generated power supplied to the electric motors 2A, 2B of the rear-wheel-drive system 1 from the electric power 5 of the front-wheel-drive system 1 equals the consumed power by the electric motors 2A, 2B of the rear-wheel-drive system 1.

Figure 14:
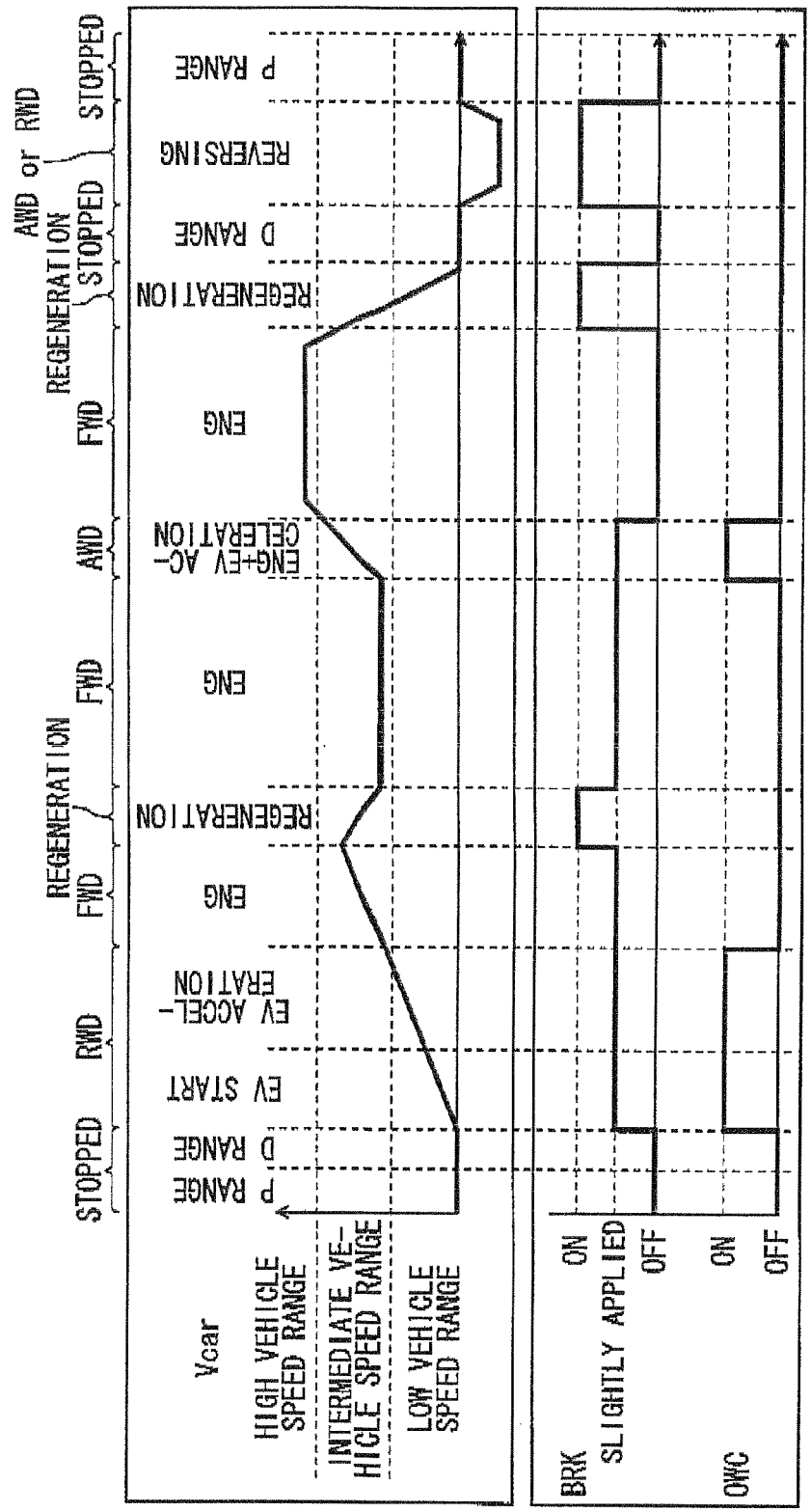
FIG. 14 is a timing chart when the vehicle is running

FIG. 14 is a timing chart of the electric oil pump 70 (EOP), the one-way clutch 50 (OWC), the hydraulic brakes 60A, 60B (BRK) when the vehicle undergoes EV start from a standstill→EV acceleration→Engine acceleration→decelerating regeneration→intermediate speed cruising→acceleration→high speed cruising→decelerating regeneration→stop→reversing→stop.

Firstly, the ignition is turned on, and the gear shift lever is shifted from the P range to the D range. Then, the one-way clutch 50 is controlled to be kept disengaged (OFF) and the hydraulic brakes 60A, 60B are controlled to be kept released (OFF) until the acceleration pedal is depressed. Then, when the acceleration pedal is depressed, the EV start and EV acceleration are performed by the rear-wheel-drive system 1 in the rear-wheel drive (RWD). As this occurs, the one-way clutch 50 is engaged (ON), and the hydraulic brakes 60A, 60B are controlled to be put in the slightly engaged state. Then, when the vehicle speed increases from a low vehicle speed range to reach a high vehicle speed range and the rear-wheel drive is shifted to the front-wheel drive, the vehicle is driven by the engine 4 for ENG running (FWD). As this occurs, the one-way clutch 50 is disengaged (OFF), and the hydraulic brakes 60A, 60B are kept remaining in the same state. Then, when the decelerating regeneration is triggered by depressing the brake pedal, the hydraulic brakes 60A, 60B are controlled to be applied (ON) while the one-way clutch 50 is kept disengaged (OFF). While the vehicle is driven to cruise at intermediate speeds by the engine 4, the same state as that occurring during ENG running results. Following this, when the acceleration pedal is depressed further so that the vehicle is shifted from the front-wheel drive to the four-wheel drive (AWD), the one-way clutch 50 is engaged again (ON). Then, when the vehicle speed reaches the high vehicle speed range from the intermediate vehicle speed range, the ENG running (FWD) by the engine 4 is performed again. As this occurs, the one-way clutch 50 is disengaged (OFF), and the hydraulic brakes 60A, 60B are controlled so as to be released (OFF). Then, when a decelerating regeneration is performed, the same state as that occurring during the decelerating regeneration described above results. Then, when the vehicle is stopped, the one-way clutch 50 is controlled to be disengaged (OFF), while the hydraulic brakes 60A, 60B are controlled to be released (OFF).

Following this, when the vehicle reverses, the vehicle is shifted to the rear-wheel drive (RWD) or the four-wheel drive (AWD), whereby the hydraulic brakes 60A, 60B are controlled to be applied (ON) while the one-way clutch 50 is kept disengaged (OFF). Then, when the vehicle is stopped, the one-way clutch 50 is disengaged (OFF) again, and the hydraulic brakes 60A, 60B are controlled to be released (OFF).

According to the embodiment, when the vehicle reverses, the reverse driving force is generated at least in the rear-wheel-drive system 1 to reverse the vehicle. As this occurs, the ECU 45 applies the hydraulic brakes 60A, 60B so as to connect the electric motors 2A, 2B side with the rear wheels Wr side and drives the electric motors 2A, 2B to generate the rotational power in the reverse direction. In other words, when the vehicle reverses, the ECU 45 prohibits the reverse drive by the driving force of the front-wheel-drive system 6 only. Consequently, the ECU 45 has a function as the reverse prohibiting unit of the front-wheel-drive system 6. In the event that the vehicle is reversed only by the reverse driving force of the front-wheel-drive system 6 when the vehicle reverses, the one-way clutch 50 is engaged, thus, the vehicle energy efficiency may be deteriorated due to friction of the electric motors 2A, 2B or the reverse running performance (the running through performance) may be deteriorated. However, the deterioration of vehicle energy efficiency or reverse running performance can be suppressed by reversing the vehicle by causing the reverse driving force to be generated at least in the rear-wheel-drive system 1.

When the vehicle reverses, the ECU 45 performs the switching between the rear wheels reversing state in which the reverse driving force is generated only in the rear-wheel-drive system 1 and the front and rear wheels reversing state in which the reverse driving force is generated in the rear-wheel-drive system 1 and the front-wheel-drive system 6, whereby the vehicle can reverse appropriately in accordance with the vehicle energy efficiency or the running conditions.

The ECU 45 performs the switching between the rear wheels reversing state and the front and rear wheels reversing state based on the road surface condition from the road surface condition acquiring unit 81 for estimating or detecting the road surface condition, whereby the vehicle is allowed to reverse more appropriately. The road surface condition may be referred to as the road surface inclined condition. In this case, when the road surface is detected as being inclined, by switching from the rear wheels reversing state to the front and rear wheels reversing state when the inclination toward the reversing direction is larger than a predetermined value, even when the vehicle is climbing a steep slope, the occurrence of a slip can be prevented or suppressed, and the risk of the vehicle being unable to climb the steep slope can be prevented or suppressed. When the inclination toward the reversing direction is equal to or smaller than the predetermined value, the front and rear wheels reversing state can be switched to the rear wheels reversing state, thereby increasing the energy efficiency when the vehicle reverses.

The road surface condition may be referred to as the road surface friction condition. In this case, by switching from the rear wheels reversing state to the front and rear wheels reversing state when the road surface friction condition is lower than a predetermined friction condition, the occurrence of a slip can be prevented or suppressed even on a road covered with snow. When the road surface friction condition is in a high friction condition, the front and rear wheels reversing state can be switched to the rear wheels reversing state, whereby the energy efficiency when the vehicle reverses can be increased.

The ECU 45 determines on switching after it has acquired a reverse intention of the driver from the reverse intention acquiring unit for detecting or estimating the reverse intension of the driver and before the vehicle starts to reverse, thereby suppressing the occurrence of a slip when the vehicle starts to reverse.

The ECU 45 switches the rear wheels reversing state to the front and rear wheels reversing state when a slip condition is acquired from the slip condition acquiring unit 82 for estimating or detecting a slip on the rear wheels Wr when the vehicle reverses in the rear wheels reversing state. Therefore, the slip occurring when the vehicle is reversing in the rear wheels reversing state can be eliminated in an early stage of the occurrence of the slip.

The ECU 45 controls the engine 4 and the electric motor 5 of the front-wheel-drive system 6 based on the SOC from the charged condition acquiring unit 83 for estimating or detecting the SOC of the battery 9 which supplies power to the electric motors 2A, 2b and the electric motor 5. Therefore, the vehicle energy efficiency and the running through performance can be controlled as required by the ECU 45. In particular, when SOC is smaller than the predetermined value, the ECU 45 controls the front-wheel-drive system 6 so as to generate a driving force only from the engine 4, whereby no driving force is generated from the electric motor 5 of the front-wheel-drive system 6, which enables the power of the battery 9 to be supplied only to the electric motors 2A, 2B of the rear-wheel-drive system 1. Thus, even when SOC is low, the front and rear wheels reversing can be performed. On the contrary, when SOC is equal to or larger than the predetermined value, the ECU 45 controls the front-wheel-drive system 6 so as to generate the driving force at least from the electric motor 5, whereby the load of the engine 4 can be reduced, thereby increasing the energy efficiency. As this occurs, the front-wheel-drive system 6 may be controlled so that the driving force is generated from the electric motor 5 and the engine 4 is stopped. The energy efficiency can further be increased by stopping the engine 4.

When the vehicle reverses in the rear wheels reversing state, the ECU 45 drives the electric motors 2A, 2B of the rear-wheel-drive system 1 by consuming selectively at least either the generated power of the electric motor 5 of the front-wheel-drive system 1 or the power of the battery 9. Therefore, the electric motors 2A, 2B of the rear-wheel-drive system 1 can be driven appropriately in accordance with the condition of the battery 9 or the condition of the electric motor 5 of the front-wheel-drive system 6. For example, when the battery temperature is lower than the predetermined value, the ECU 45 controls that the generated power which is supplied to the electric motors 2A, 2B of the rear-wheel-drive system 1 from the electric motor 5 of the front-wheel-drive system 1 does not exceed the consumed power by the electric motors 2A, 2B of the rear-wheel-drive system 1, whereby the generated power does not exceed the consumed power, and therefore, the flow of power into the battery 9 can be suppressed when the temperature of the battery 9 is low. As this occurs, by controlling so that the generated power which is supplied to the electric motors 2A, 2B of the rear-wheel-drive system 1 from the electric motor 5 of the front-wheel-drive system 6 equals the consumed power by the electric motors 2A, 2B of the rear-wheel-drive system 1, the generated power does not become short relative to the consumed power, thereby outputting a desired driving force by the electric motors 2A, 2B of the front-wheel-drive system 1.

When the battery 9 is charged low, the ECU 45 controls so that only the generated power by the electric motor 5 of the front-wheel-drive system 1 is supplied to the electric motors 2A, 2B of the rear-wheel-drive system 1, whereby the electric motors 2A, 2B of the rear-wheel-drive system 1 can be driven without taking out any power from the battery 9. Further, by the ECU 45 controlling so that the generated power which is supplied to the electric motors 2A, 2B of the rear-wheel-drive system 1 from the electric motor 5 of the front-wheel-drive system 6 becomes larger than the consumed power by the electric motors 2A, 2B of the rear-wheel-drive system 1, the battery 9 can be charged while outputting a driving power desired by the electric motors 2A, 2B of the rear-wheel-drive system 1.

The invention is not limited to the embodiment that has been described heretofore but can be modified or improved as required.

Figure 15:
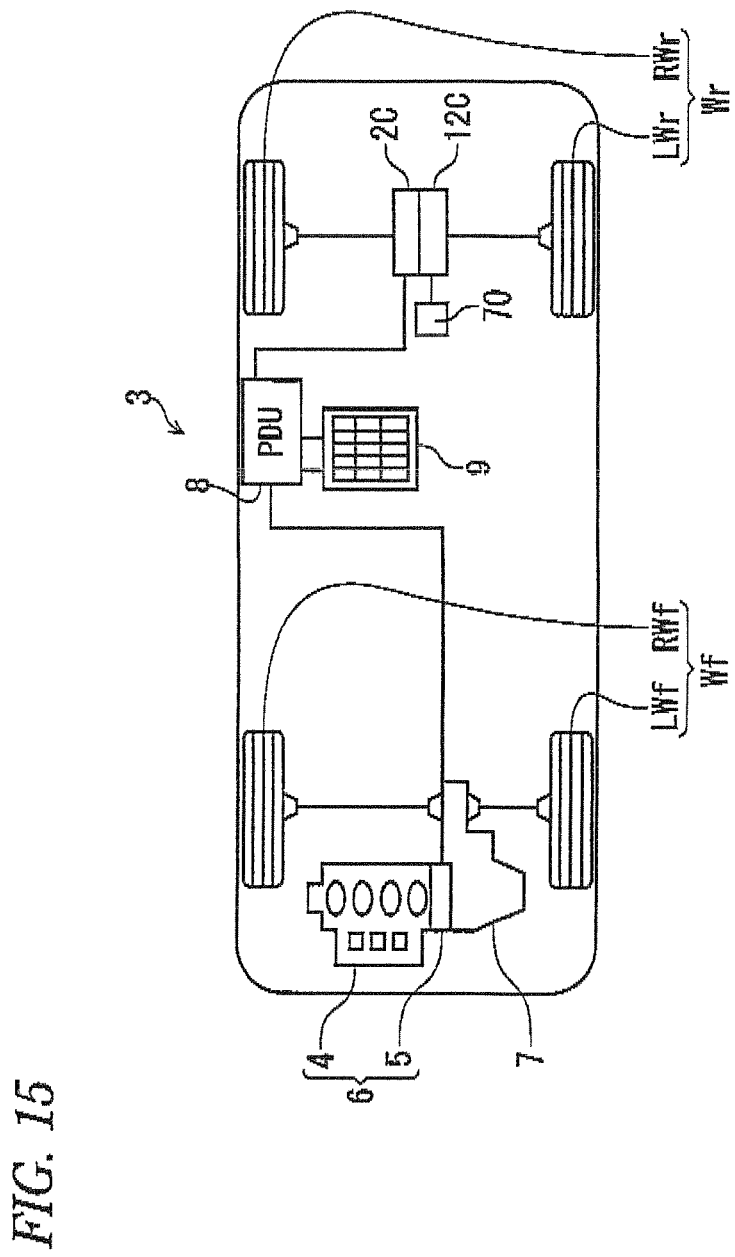
FIG. 15 illustrates a vehicle in which a rear-wheel-drive system according to a modified example is mounted.
Figure 16:
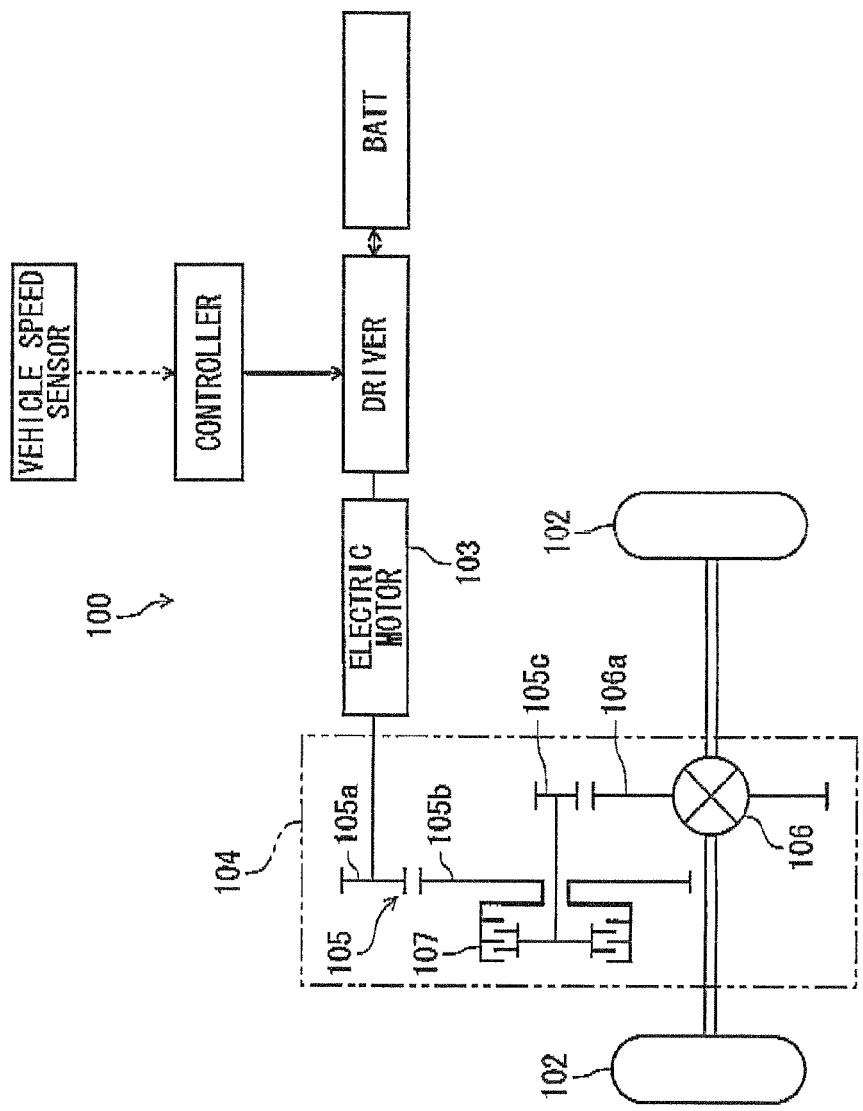
FIG. 16 illustrates a vehicle drive system in JP-2006-258279-A.
Figure 17:
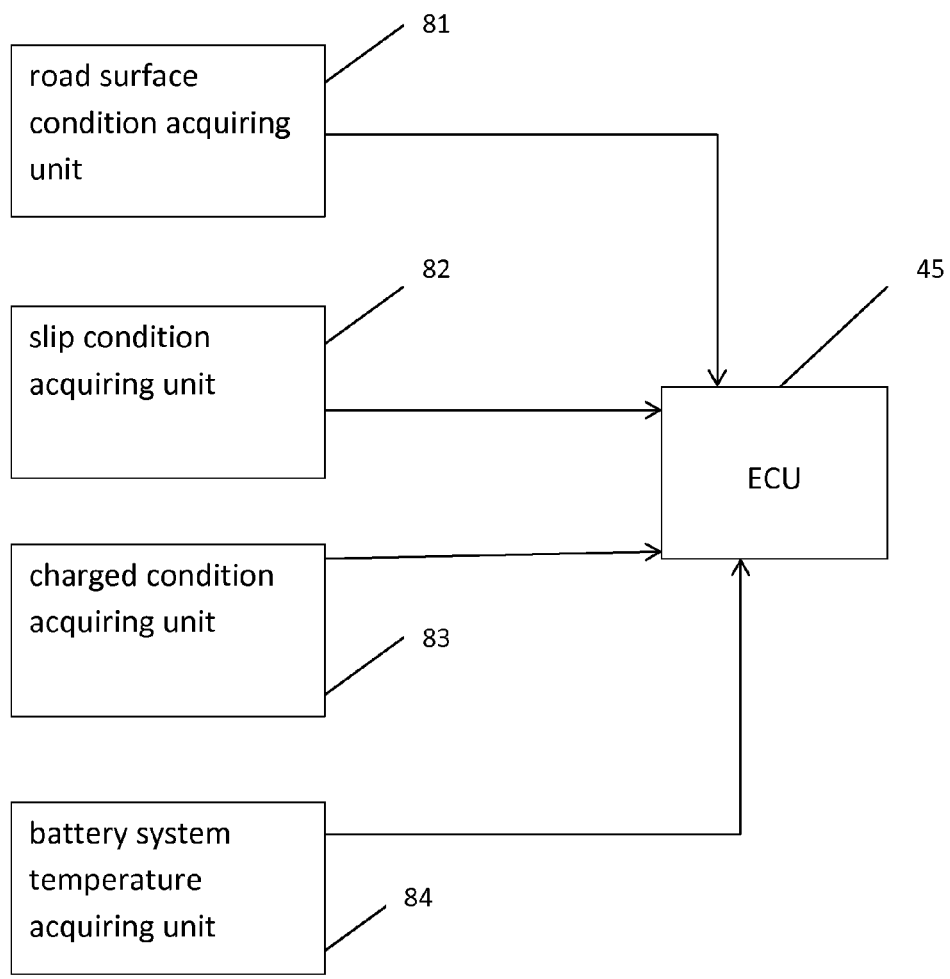
FIG. 17 is a schematic diagram of a control unit of the embodiment.

For example, in the rear-wheel-drive system 1 of the embodiment, the planetary gear type reduction gears 12A, 12B are provided individually on the two electric motors 2A, 2B so as to control the left rear wheel LWr and the right rear wheel kWr, respectively. However, the invention is not limited thereto, and hence, a configuration shown in FIG. 15 may be adopted in which one electric motor 2C and one reduction gear 12C may be connected to a differential gear, not shown.

For example, in the rear-wheel-drive system 1 of the embodiment, the planetary gear type reduction gears 12A, 12B are described as being provided on the power transmission line between the electric motors 2A, 2B and the rear wheels Wr (RWr, LWr). However, the rear-wheel-drive system 1 does not necessarily include transmissions like the planetary gear type reduction gears 12A, 12B.

The hydraulic brakes 60A, 60B are described as functioning as the engagement/disengagement unit. However, a known mechanical engagement/disengagement unit may be used.

The vehicle 3 may be an electric vehicle in which the electric motor 5 is used as an only single drive source without using the engine 4 in the front-wheel-drive system 6.

The ECU 45 may include an ECU for the rear-wheel-drive system 1 which controls the electric motors 2A, 2B and the hydraulic brakes 60A, 60B of the same drive system 1, an ECU for the front-wheel-drive system 6 which controls the engine 4 and the electric motor 5 of the same drive system 6 and an ECU as the advance/reverse control unit which controls the drive system 1 and the drive system 6. Further, the ECU for the drive system 1 may include an electric motor ECU which controls the electric motors 2A, 2B and an engagement/disengagement unit ECU which controls the hydraulic brakes 60A, 60B.

The electric motor 5 of the front-wheel-drive system 6 and the electric motors 2A, 2B of the rear-wheel-drive system 1 may be connected to different batteries.

The invention claimed is:

1. A front- and rear-wheel-drive vehicle comprising:
   first drive wheels which are one of front wheels and rear wheels;
   second drive wheels which are the other of the front wheels and the rear wheels;
   a first drive system configured to drive the first drive wheels; and
   a second drive system configured to drive the second drive wheels, wherein the first drive system comprises:
   an electric motor configured to generate a driving force for the vehicle;
   a motor controller configured to control the electric motor;
   an engagement/disengagement unit provided in a power transmission line between the electric motor and the first drive wheels, and configured to engage or disengage the electric motor side of the power transmission line and the first drive wheels side of the power transmission line;
   an engagement/disengagement controller configured to control a state of the engagement/disengagement unit to engage or disengage the electric motor side of the power transmission line and the first drive wheels side of the power transmission line; and
   a one-way power transmission device provided in the power transmission line, the one-way power transmission device and the engagement/disengagement unit being provided in parallel between the electric motor side of the power transmission line and the first drive wheels side of the power transmission line, and the one-way power transmission device being configured to come into:
   a connected state when a forward-direction rotational power is inputted from the electric motor side of the power transmission line to the first drive wheels side of the power transmission line,
   a disconnected state when a reverse-direction rotational power is inputted from the electric motor side of the power transmission line to the first drive wheels side of the power transmission line,
   the disconnected state when the forward-direction rotational power is inputted from the first drive wheels side of the power transmission line to the electric motor of the power transmission line and
   the connected state when the reverse-direction rotational power is inputted from the first drive wheels side of the power transmission line to the electric motor side of the power transmission line,
   wherein, when the vehicle reverses, a reverse driving force to reverse the vehicle is generated at least in the first drive system, and
   wherein, when the reverse driving force is generated in the first drive system, the engagement/disengagement controller controls the engagement/disengagement unit to engage the electric motor side of the power transmission line with the first drive wheels side of the power transmission line, and the motor controller drives the electric motor to generate the reverse-direction rotational power such that the reverse-direction rotational power is inputted from the electric motor side of the power transmission line to the first drive wheels side of the power transmission line.

2. The vehicle of claim 1, further comprising;
a reversing controller configured to perform a switching, when the vehicle reverses, between
a one wheels reversing state in which the reverse driving force is generated only in the first drive system and
a front and rear wheels reversing state in which the reverse driving force is generated in both the first drive system and the second drive system.

3. The vehicle of claim 2, farther comprising:
a road surface condition acquiring unit configured to estimate or detect a road surface condition,
wherein the reversing controller performs the switching based on the road surface condition.

4. The vehicle of claim 3,
wherein the road surface condition acquiring unit estimates or detects an inclined condition of the road surface as the road surface condition, and
wherein the reversing controller performs the switching based on the inclined condition of the road surface.

5. The vehicle of claim 4,
wherein the reversing controller performs the switching to the front and rear wheels reversing state when an inclination toward a reversing direction is larger than a predetermined value.

6. The vehicle of claim 3,
wherein the road surface condition acquiring unit estimates or detects a friction condition of the road surface as the road surface condition, and
wherein the reversing controller performs the switching based on the friction condition of the road.

7. The vehicle of claim 6,
wherein the reversing controller performs the switching to the front and rear wheels reversing state when a friction is lower than a predetermined value.

8. The vehicle of claim 2, further comprising:
a reverse intention acquiring unit configured to estimate or detect a reverse intention of the driver of the vehicle, and
wherein the reverse intention acquiring unit determines whether the switching should be performed or not after the reverse intention is acquired and before the vehicle starts to reverse.

9. The vehicle of claim 2, further comprising:
a slip condition acquiring unit configured to estimate or detect a slip in the first drive wheels when the vehicle reverses in the one wheels reversing state, and
wherein the reversing controller performs the switching to the front and rear wheels reversing state when the slip occurs.

10. The vehicle of claim 2,
wherein the second drive system comprises:
an engine configured to generate a driving force for the vehicle; and
an additional electric motor,
the vehicle further comprising:
a charged condition acquiring unit configured to estimate or detect a charged amount of a battery system configured to supply power to the electric motor and tile, additional motor, and
wherein the reversing controller controls the engine and the additional electric motor based on the charged amount when the vehicle reverses in the front and rear wheels reversing state.

11. The vehicle of claim 10,
wherein, when the charged amount is lower than a predetermined value, the reversing controller controls the second drive system to generate the driving force by using at least the engine.

12. The vehicle of claim 10,
wherein, when the charged amount is equal to or larger than the predetermined value, the reversing controller controls the second drive system to generate the driving force by using at least the additional electric motor.

13. The vehicle of claim 10,
wherein, when the charged amount is equal to or larger than the predetermined values the reversing controller controls the second drive system to generate the driving force by using the additional electric motor while stopping the engine.

14. The vehicle of claim 1,
wherein the second drive system comprises:
an engine configured to generate a driving force for the vehicle; and
an additional electric motor,
the vehicle further comprising:
a battery system configured to store a power generated by the additional electric motor; and
a power supply controller configured to control a power supply to the electric motor, and
wherein the electric motor is driven by consuming at least either the generated power by the additional electric motor or the supplied power of the battery system.

15. The vehicle of claim 14 further comprising:
a battery system temperature acquiring unit configured to estimate or detect a temperature of the battery system,
wherein, when the temperature of the battery system is lower than a predetermined value, the power supply controller and the motor controller control so that the generated power which is supplied to the electric motor from the additional electric motor does not exceed a consumed power by the electric motor.

16. The vehicle of claim 15,
wherein, when the temperature of the battery system is lower than a predetermined value, the power supply controller and the motor controller control so that the generated power which is supplied to the electric motor from the additional electric motor equals to a consumed power by the electric motor.

17. The vehicle of claim 14,
wherein the power supply controller and the motor controller control so that the generated power which is supplied to the electric motor from the additional electric motor becomes larger than a consumed power by the electric motor.

18. The vehicle of claim 14, further comprising:
a charged condition acquiring unit configured to estimate or detect a charged amount of the battery system,
wherein, when the charged amount is lower than a predetermined value, the power supply controller and the motor controller control so that the generated power which is supplied to the electric motor from the additional electric motor becomes larger than the consumed power by the electric motor.

19. The vehicle of claim 14,
wherein the power supply controller controls so that only the generated power by the additional electric motor is supplied to the electric motor.

20. The vehicle of claim 19, further comprising:
a charged condition acquiring unit configured to estimate or detect a charged amount of the battery system,
wherein, when the charged amount is lower than a predetermined value, the power supply controller controls so that only the generated power by the additional electric motor is supplied to the electric motor.

21. The vehicle of claim 1,
wherein the engagement/disengagement controller controls the state of the engagement/disengagement unit to engage the electric motor side of the power transmission line and the first drive wheels side of the power transmission line when the forward-direction rotational power is inputted from the first drive wheels side of the power transmission line to the electric motor side of the power transmission line.

22. The vehicle of claim 1,
wherein the one-way power transmission device is a one-way clutch.

23. A front- and rear-wheel-drive vehicle comprising:
first drive wheels which are one of front wheels and rear wheels;
second drive wheels which are the other of the front wheels and the rear wheels;
a first drive system configured to drive the first drive wheels; and
a second drive system configured to drive the second drive wheels,
wherein the first drive system comprises:
an electric motor configured to generate a driving force for the vehicle;
a motor controller configured to control the electric motor;
an engagement/disengagement unit provided in a power transmission line between the electric motor and the first drive wheels, and configured to engage or disengage the electric motor side of the power transmission line and the first drive wheels side of the power transmission line;
an engagement/disengagement controller configured to control a state of the engagement/disengagement unit to engage or disengage the electric motor side of the power transmission line and the first drive wheels side of the power transmission line; and
a one-way power transmission device provided in the power transmission line, the one-way power transmission device and the engagement/disengagement unit being provided in parallel between the electric motor side of the power transmission line and the first drive wheels side of the power transmission line, and the one-way power transmission device being configured to come into:
a connected state when a forward-direction rotational power is inputted from the electric motor side of the power transmission line to the first drive wheels side of the power transmission line,
a disconnected state when a reverse-direction rotational power is inputted from the electric motor side of the power transmission line to the first drive wheels side of the power transmission line,
the disconnected state when the forward-direction rotational power is inputted from the first drive wheels side of the power transmission line to the electric motor side of the power transmission line and
the connected state when the reverse-direction rotational power is inputted from the first drive wheels side of the power transmission line to the electric motor side of the power transmission line,
the vehicle further comprising
a reverse prohibiting unit configured to prohibit reverse driving using only the driving force of the second drive system when the vehicle reverses such that the reverse-direction rotational power is inputted from the electric motor side of the power transmission line to the first drive wheels side of the power transmission line.

24. The vehicle of claim 23,
wherein the one-way power transmission device is a one-way clutch.

25. The vehicle of claim 23,
wherein, when the vehicle reverses by a two-wheel drive, the reverse prohibiting unit prohibits the reverse driving using only the driving force of the second drive system.

* * * * *